US012773929B2

(12) United States Patent
Tachikawa et al.

(10) Patent No.: US 12,773,929 B2
(45) Date of Patent: Oct. 27, 2026

(54) LATCH DEVICE, VEHICLE SEAT, AND VEHICLE

(71) Applicant: TS TECH CO., LTD., Asaka (JP)

(72) Inventors: Yoichi Tachikawa, Tochigi (JP); Soichiro Kamei, Tochigi (JP)

(73) Assignee: TS TECH CO., LTD., Asaka (JP)

(*) Notice: Subject to any disclaimer, the term of this patent is extended or adjusted under 35 U.S.C. 154(b) by 110 days.

(21) Appl. No.: 18/842,946

(22) PCT Filed: Feb. 28, 2023

(86) PCT No.: PCT/JP2023/007349
§ 371 (c)(1),
(2) Date: Aug. 30, 2024

(87) PCT Pub. No.: WO2023/167194
PCT Pub. Date: Sep. 7, 2023

(65) Prior Publication Data
US 2025/0162474 A1 May 22, 2025

Related U.S. Application Data

(60) Provisional application No. 63/315,142, filed on Mar. 1, 2022, provisional application No. 63/315,151, filed
(Continued)

(51) Int. Cl.
*B60N 2/36* (2006.01)
*B60N 2/22* (2006.01)
*B60N 2/90* (2018.01)

(52) U.S. Cl.
CPC ........... *B60N 2/2245* (2013.01); *B60N 2/366* (2013.01); *B60N 2/933* (2018.02); *B60N 2002/952* (2018.02)

(58) Field of Classification Search
CPC .............................. B60N 2/2245; B60N 2/366
(Continued)

(56) References Cited

U.S. PATENT DOCUMENTS 5,664,839 A * 9/1997 Pedronno ............... B60N 2/366
297/378.13
5,829,831 A * 11/1998 Sharman ................. B60R 22/34
297/378.12 X (Continued)

FOREIGN PATENT DOCUMENTS

DE 4444122 C1 * 4/1996 ............. B60N 2/366
DE 19653216 A1 * 6/1997 ............. B60N 2/366

(Continued)

OTHER PUBLICATIONS

International Search Report with English translation received in corresponding Application No. PCT/JP2023/007349, dated May 23, 2023, 4 pages.

(Continued)

*Primary Examiner* — Rodney B White
(74) *Attorney, Agent, or Firm* — Dority and Manning, P.A.

(57) ABSTRACT

There are provided a latch device, a vehicle seat, and a vehicle capable of reducing the number of components, manufacturing man-hours, and costs. A latch device includes a latch that can transition between a locked state where the latch is engaged with a striker and an unlocked state where the latch is disengaged from the striker; an unlocking operation knob for switching the latch from the locked state to the unlocked state; an indicator provided on the unlocking operation knob, and showing each state of the locked state and the unlocked state of the latch; a link that transmits each state of the latch to the indicator; and a pin that engages with the link, and that transmits each state of the latch to the
(Continued)

indicator, each state being transmitted from the link. The pin is provided on the unlocking operation knob.

16 Claims, 18 Drawing Sheets

Related U.S. Application Data on Mar. 1, 2022, provisional application No. 63/315,150, filed on Mar. 1, 2022, provisional application No. 63/315,146, filed on Mar. 1, 2022.

(58) Field of Classification Search
USPC ...................................................... 297/378.13
See application file for complete search history.

(56) References Cited

U.S. PATENT DOCUMENTS

| | | | | | |
|---|---|---|---|---|---|
| 6,139,076 | A * | 10/2000 | Hara | B60N 2/366 | 292/336.3 |
| 7,226,129 | B2 * | 6/2007 | Brandes | B60N 2/366 | 297/378.13 X |
| 7,377,584 | B2 * | 5/2008 | Griswold | B60N 2/366 | 297/378.13 |
| 7,416,254 | B2 * | 8/2008 | Jennings | B60N 2/366 | 297/378.13 X |
| 7,819,478 | B2 * | 10/2010 | Griswold | B60N 2/2245 | 297/378.13 X |
| 8,393,682 | B2 * | 3/2013 | Hosoda | B60N 2/366 | 297/378.13 X |
| 8,684,464 | B2 * | 4/2014 | Muller | B60N 2/01583 | 297/378.13 |
| 9,039,048 | B2 * | 5/2015 | Muller | B60N 2/366 | 297/336 X |
| 9,199,554 | B2 * | 12/2015 | Müller | B60N 2/01583 | |
| 9,216,672 | B2 * | 12/2015 | Windecker | B60N 2/366 | |
| 9,238,420 | B2 * | 1/2016 | Seto | B60N 2/366 | |
| 9,290,116 | B2 * | 3/2016 | Teufel | B60N 2/12 | |
| 9,297,188 | B2 * | 3/2016 | Mensch | B60N 2/366 | |
| 9,440,564 | B2 * | 9/2016 | Crossley | B60N 2/305 | |
| 10,214,124 | B2 * | 2/2019 | Noguchi | B60N 2/3011 | |
| 10,906,443 | B2 * | 2/2021 | Pasternak | B60N 2/20 | |
| 11,021,083 | B2 * | 6/2021 | Noguchi | B60N 2/20 | |
| 11,167,668 | B2 * | 11/2021 | Kondo | B60N 2/3009 | |
| 12,005,854 | B2 * | 6/2024 | Ozcan | B60R 22/26 | |
| 2005/0264043 | A1 | 12/2005 | Brandes et al. | | |
| 2006/0108847 | A1 * | 5/2006 | O'Callaghan | B60N 2/22 | 297/344.1 |
| 2011/0012415 | A1 | 1/2011 | Müller et al. | | |
| 2015/0033809 | A1 * | 2/2015 | Mueller | B60N 2/919 | 70/237 |
| 2024/0253547 | A1 * | 8/2024 | Mueller | B60N 2/20 | |

FOREIGN PATENT DOCUMENTS

| | | | | | |
|---|---|---|---|---|---|
| DE | 10142486 | A1 * | 3/2003 | B60N 2/366 |
| DE | 10328504 | B3 * | 12/2004 | B60N 2/366 |
| DE | 102004057338 | A1 * | 6/2006 | E05B 85/26 |
| DE | 102011009002 | A1 * | 7/2011 | B60N 2/366 |
| DE | 102011018330 | A1 * | 10/2012 | B60N 2/3065 |
| DE | 102011054990 | A1 * | 5/2013 | B60N 2/366 |
| DE | 102013202010 | A1 * | 8/2014 | B60N 2/366 |
| DE | 102013216220 | B3 * | 12/2014 | B60N 2/366 |
| DE | 102014112031 | A1 * | 2/2016 | E05C 3/24 |
| DE | 102011054990 | B4 | 5/2021 | |
| JP | S 60255511 | A | 12/1985 | |
| JP | 6864213 | B | 3/2018 | |
| JP | 2018052397 | A | 4/2018 | |
| JP | 2019189036 | A | 10/2019 | |
| KR | 20210064661 | A * | 6/2021 | B60N 2/22 |
| WO | WO-2014019932 | A1 * | 2/2014 | B60N 2/305 |

OTHER PUBLICATIONS

Extended European Search Report for corresponding Application No. 23763451.4, dated Oct. 1, 2025, 15 pages.

* cited by examiner

LATCH DEVICE, VEHICLE SEAT, AND VEHICLE

CROSS-REFERENCE TO RELATED APPLICATIONS

This application is the U.S. National Stage entry of International Application No. PCT/JP2023/007349, filed on Feb. 28, 2023, which, in turn, claims priority to U.S. Provisional Patent Application No. 63/315,142, filed Mar. 1, 2022; U.S. Provisional Patent Application No. 63/315,146, filed Mar. 1, 2022; U.S. Provisional Patent Application No. 63/315,150, filed Mar. 1, 2022; and U.S. Provisional Patent Application No. 63/315,151, filed on Mar. 1, 2022, all of which are hereby incorporated herein by reference in their entireties for all purposes.

TECHNICAL FIELD

The present invention relates to a latch device, a vehicle seat, and a vehicle, particularly to a latch device that engages with a striker installed on a vehicle seat in which an occupant is seated or on a vehicle body, a vehicle seat, and a vehicle.

BACKGROUND ART

Conventionally, a technique for making an inclined state or an upright state of a vehicle seat variable to effectively use a space in a vehicle interior or to improve ride comfort of a seated occupant has been generally known.

Furthermore, in order to maintain the state of the vehicle seat, it has been known that a striker is fixed to a vehicle body side and an engagement device that engages with the striker is provided on a vehicle seat side.

For example, PATENT LITERATURE 1 or PATENT LITERATURE 2 describes a latch device including a latch (hook) that engages with a striker; an operating member that operates the latch; an indicator showing a locked state of the latch; and a link that transmits the locked state of the latch to the indicator.

In the latch device described in PATENT LITERATURE 1, by providing a pin on the link (intermediate link) and displacing the pin in an elongated hole of a striker detection member, the locked state of the latch is transmitted to the indicator.

In the latch device (seat lock device) described in PATENT LITERATURE 2, by displacing a pin, which is provided on the latch, in an elongated hole-shaped cam groove of the link (cam plate), the locked state of the latch is transmitted to the indicator.

CITATION LIST

Patent Literature

PATENT LITERATURE 1: JP 6864213 B2
PATENT LITERATURE 2: JP 2019-189036 A

SUMMARY OF INVENTION

Technical Problem

However, in the latch device described in PATENT LITERATURE 1, since the pin for operating the indicator is provided on a member separate from the operating member, the number of components, weight, and manufacturing man-hours are increased, thereby increasing costs, which is a risk.

In addition, in the seat lock device described in PATENT LITERATURE 2, an engaging portion that engages with the pin provided on the latch has an elongated hole shape, so that the ease of assembly decreases and manufacturing man-hours increase, which is a risk.

Therefore, the present invention has been made in view of the above-described circumstances, and an object of the present invention is to provide a latch device, a vehicle seat, and a vehicle capable of reducing the number of components, manufacturing man-hours, and costs.

Solution to Problem

The above-described problems are solved by a latch device of the present invention, a vehicle seat provided with the latch device, and a vehicle provided with the vehicle seat, the latch device that engages with a striker installed on a vehicle body or the vehicle seat, including: a latch that can transition between a locked state where the latch is engaged with the striker and an unlocked state where the latch is disengaged from the striker; an unlocking operation knob for switching the latch from the locked state to the unlocked state; an indicator provided on the unlocking operation knob, and showing each state of the locked state and the unlocked state of the latch; a link that transmits each state of the latch to the indicator; and a pin that engages with the link, and that transmits each state of the latch to the indicator, each state being transmitted from the link. The pin is provided on the unlocking operation knob.

According to the above-described configuration, since the pin is provided on the unlocking operation knob, the number of components, manufacturing man-hours, and costs can be reduced compared to a configuration in which the pin is a separate component.

In addition, it is preferable that the link includes an engaging portion at an end portion on an unlocking operation knob side of the link, the engaging portion engaging with the pin, and it is preferable that one end portion on a pin side of the engaging portion is open.

According to the above-described configuration, the ease of assembly can be improved compared to an engaging portion having an elongated hole shape and surrounding the pin.

In addition, it is preferable that the pin is molded integrally with the unlocking operation knob.

According to the above-described configuration, since the pin is molded integrally with the unlocking operation knob, the number of components, manufacturing man-hours, and costs can be reduced compared to a case where a metal pin member is fixed to a resin operating knob by crimping.

In addition, it is preferable that the one end portion on the pin side of the engaging portion has an open U shape.

According to the above-described configuration, since the engaging portion on which the pin slides have a U shape obtained by making one end of an elongated hole open, a deviation in movement between the unlocking operation knob and the latch can be absorbed, and the unlocking operation knob and the latch can be smoothly operated.

In addition, it is preferable that the latch device further includes a housing that accommodates the latch inside the housing; and a lock-off detection sensor that detects the unlocked state and a lock-off state where the striker is outside the latch device, it is preferable that the latch includes a sensor contact pin that is rotatably supported by the housing, and that comes into contact with the lock-off detection sensor, it is preferable that the lock-off detection sensor includes a sensor protrusion that comes into contact with the sensor contact pin, and it is preferable that the sensor contact pin comes into contact with the sensor protrusion in the lock-off state to restrict a rotation of the latch.

According to the above-described configuration, since the latch comes into contact with the pin of the lock-off detection sensor, with a simple configuration, the indicator can show whether the latch is in the lock-off state or the locked state.

In addition, it is preferable that the lock-off detection sensor includes the sensor protrusion, a housing contact portion rotatably supported by the housing, and a striker detection portion extending from the housing contact portion toward the striker in the lock-off state to come into contact with the striker, and it is preferable that the striker detection portion curves and extends toward a side opposite to a direction in which the striker detection portion comes into contact with the striker in the lock-off state.

According to the above-described configuration, since the striker detection portion is curved in a direction in which the striker detection portion separates from the striker, the possibility of the lock-off detection sensor being caught on the striker is reduced, and deterioration of components due to friction can be suppressed. In addition, the entirety of the latch device can be made even smaller by curving the striker detection portion toward a center portion of the housing.

In addition, it is preferable that the lock-off detection sensor is accommodated inside the housing.

According to the above-described configuration, the entirety of the latch device can be made smaller by accommodating the components of the latch device inside the housing.

In addition, it is preferable that the striker detection portion is disposed between the latch and the housing contact portion in an axial direction in which the latch and the housing contact portion are supported by the housing.

According to the above-described configuration, since the striker detection portion is provided at a position separated from the housing, interference between the striker detection portion and a pad material of the vehicle seat can be suppressed.

In addition, it is preferable that the latch device further includes a housing that accommodates the latch inside the housing, it is preferable that the housing includes a housing body portion that accommodates the latch inside the housing body portion, and a flange provided on an outer periphery of the housing body portion, it is preferable that the housing body portion has a first through-hole that supports a rotating shaft of the latch, it is preferable that the flange has a second through-hole, and it is preferable that the latch device is fixed to the vehicle seat by a first fastener inserted through the first through-hole and a second fastener inserted through the second through-hole.

According to the above-described configuration, in the housing, by fixing each of the housing body portion corresponding to the rotating shaft of the latch that is thick and the flange that is thin, the latch device can be compactly and firmly attached.

In addition, it is preferable that a tightening torque of the first fastener is higher than a tightening torque of the second fastener.

According to the above-described configuration, the latch device can be more firmly attached at a position corresponding to the rotating shaft of the latch.

In addition, it is preferable that the housing has a third through-hole at a position different from positions of the first through-hole and the second through-hole, and it is preferable that the latch device is fixed to the vehicle seat by the first fastener, the second fastener, and a third fastener inserted through the third through-hole.

According to the above-described configuration, in the housing, by fixing each of the housing body portion corresponding to the rotating shaft of the latch that is thick and the flange that is thin, the latch device can be compactly and more firmly attached.

In addition, it is preferable that the latch device further includes a housing that accommodates the latch inside the housing; and a lock-off detection sensor that detects the unlocked state and a lock-off state where the striker is outside the latch device, it is preferable that each of the latch, the link, and the lock-off detection sensor is rotatably supported by the housing, it is preferable that the housing includes a plurality of biasing members that bias the latch, the link, and the lock-off detection sensor in one direction of respective rotation directions, respectively, and it is preferable that at least one of the plurality of biasing members is a spiral spring.

According to the above-described configuration, in the spiral spring, the spring thickness can be reduced without affecting the number of turns or the diameter of a spring core, and the entirety of the latch device can be made smaller.

Advantageous Effects of Invention

According to the present invention, there are provided the latch device, the vehicle seat, and the vehicle capable of reducing the number of components, manufacturing man-hours, and costs.

In addition, the ease of assembly can be improved compared to an engaging portion having an elongated hole shape and surrounding the pin.

In addition, the number of components, manufacturing man-hours, and costs can be further reduced.

In addition, a deviation in movement between the unlocking operation knob and the latch can be absorbed, and the unlocking operation knob and the latch can be smoothly operated.

In addition, with a simple configuration, the indicator can display that the latch is in the lock-off state.

In addition, the possibility of the lock-off detection sensor being caught on the striker is reduced, and deterioration of components due to friction can be suppressed. In addition, the entirety of the latch device can be made even smaller by curving the striker detection portion toward a center portion of the housing.

In addition, the entirety of the latch device can be made smaller.

In addition, interference between the striker detection portion and the pad material of the vehicle seat can be suppressed.

In addition, the latch device can be compactly and firmly attached.

In addition, the latch device can be more firmly attached at the position corresponding to the rotating shaft of the latch.

In addition, the latch device can be compactly and more firmly attached.

In addition, the spring thickness can be reduced, and the entirety of the latch device can be made smaller.

DESCRIPTION OF EMBODIMENTS

Hereinafter, one embodiment of the present invention (the present embodiment) will be described with reference to FIGS. 1A to 9E. A vehicle V that is a four-wheeled electric vehicle (EV) will be provided as one example of a vehicle, and a configuration example of the vehicle V will be described. The vehicle V may be not only a four-wheeled electric vehicle but also an engine vehicle, a hybrid vehicle including both a motor for traveling and an engine, a vehicle in which a battery and a fuel cell are mounted as a power supply, or the like.

In the following description, the "front to rear direction" refers to a front to rear direction when an occupant is seated in a vehicle seat S. The "inside to outside direction" is a right to left direction when an occupant of the vehicle V and the vehicle seat S is seated in the vehicle seat S and looks forward, or is a direction that coincides with a seat (seat back S2) width direction. In addition, the "up to down direction" is an up to down direction of the vehicle V, and is a direction that coincides with a vertical direction when the vehicle V travels on a horizontal surface.

<Outline of Latch Device>

First, the attachment position and function of a latch device L according to the present embodiment will be described with reference to FIGS. 1A to 1C.

The vehicle V includes the vehicle seat S in which an occupant is seated, and the latch device L that fixes the vehicle seat S to a vehicle body (vehicle body inner wall B).

The vehicle seat S is composed of a seat cushion S1 and the seat back S2 that is rotatably attached to the seat cushion S1.

The latch device L is provided on the vehicle seat S, and engages with a striker St installed on the vehicle body inner wall B. Specifically, the latch device L is attached to an attachment portion S2*a* on the outside of the seat back S2 in the inside to outside direction (seat width direction) at a position facing the vehicle body inner wall B.

The striker St is a U-shaped engaging member installed on the vehicle body inner wall B of the vehicle V, and protruding inward from the vehicle body inner wall B in the inside to outside direction. The latch device L can fix the vehicle seat S to the vehicle body inner wall B by being engaged with the striker St.

Figure 1A:
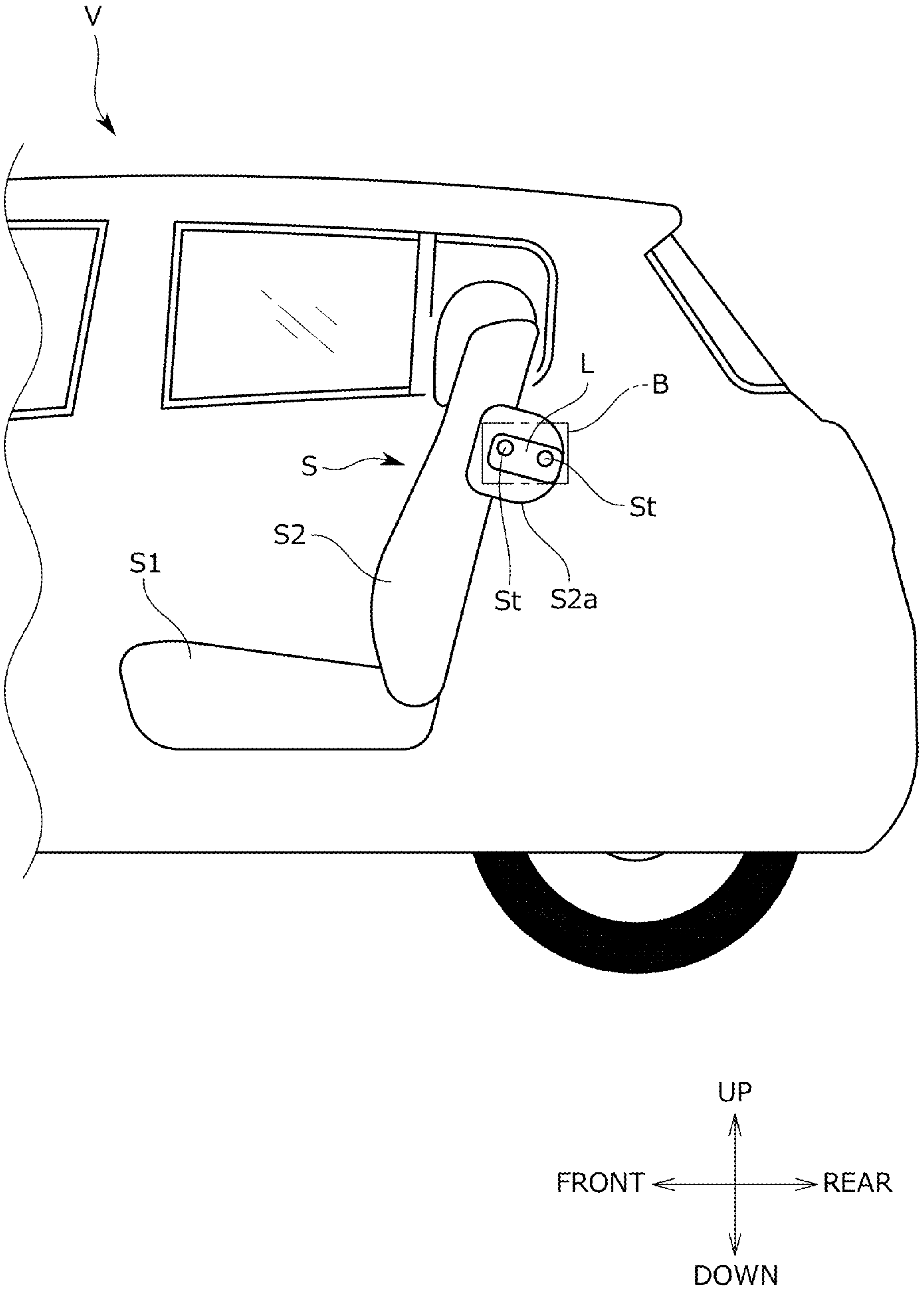
FIG. 1A is a schematic view showing a vehicle seat provided with a latch device and a vehicle, and is a view showing a state where a seat back is held by the latch device at an engagement position where the latch device is most inclined.
Figure 1B:
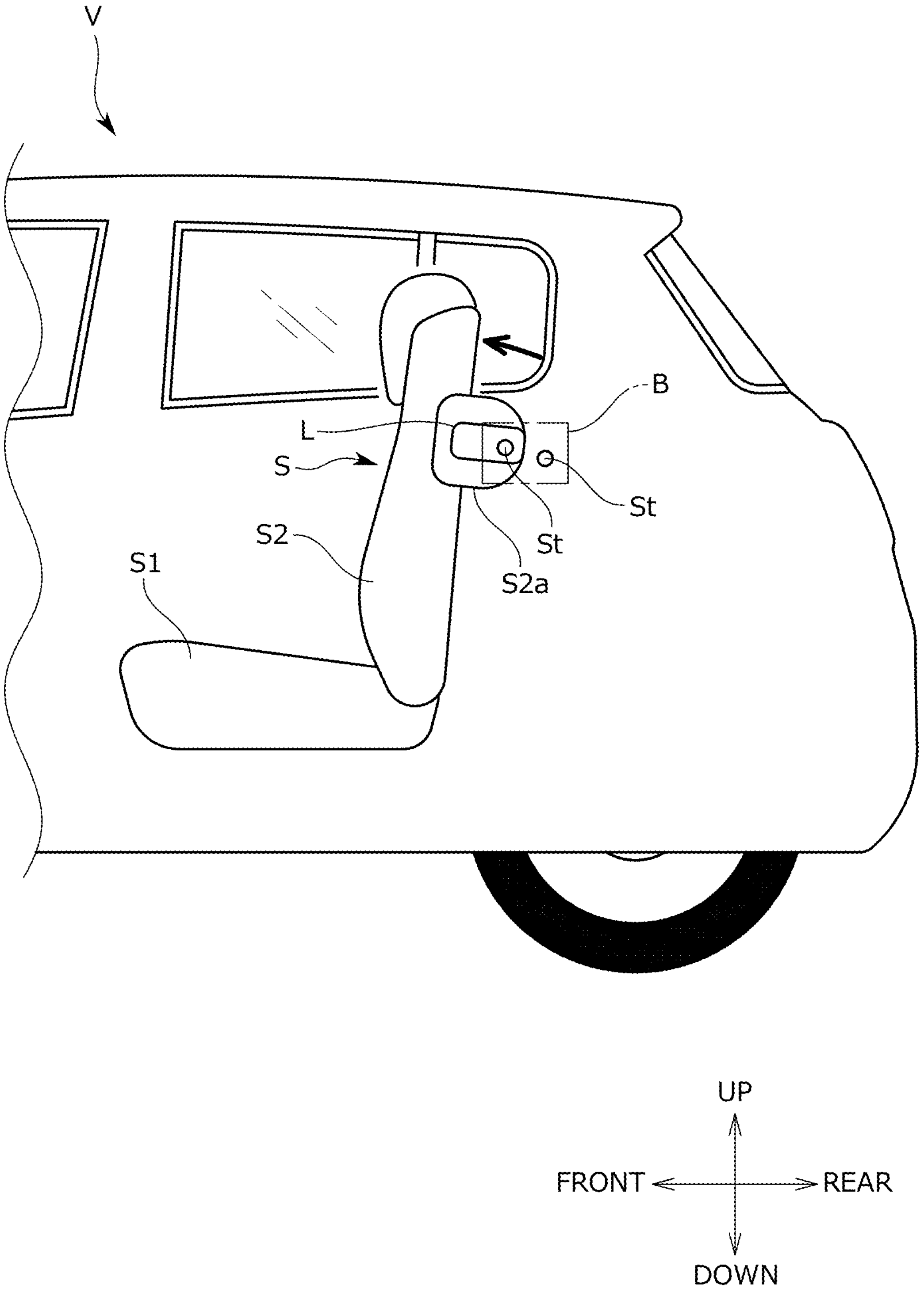
FIG. 1B is a schematic view showing the vehicle seat provided with the latch device and the vehicle, and is a view showing a state where the seat back is held at an intermediate position by the latch device.
Figure 1C:
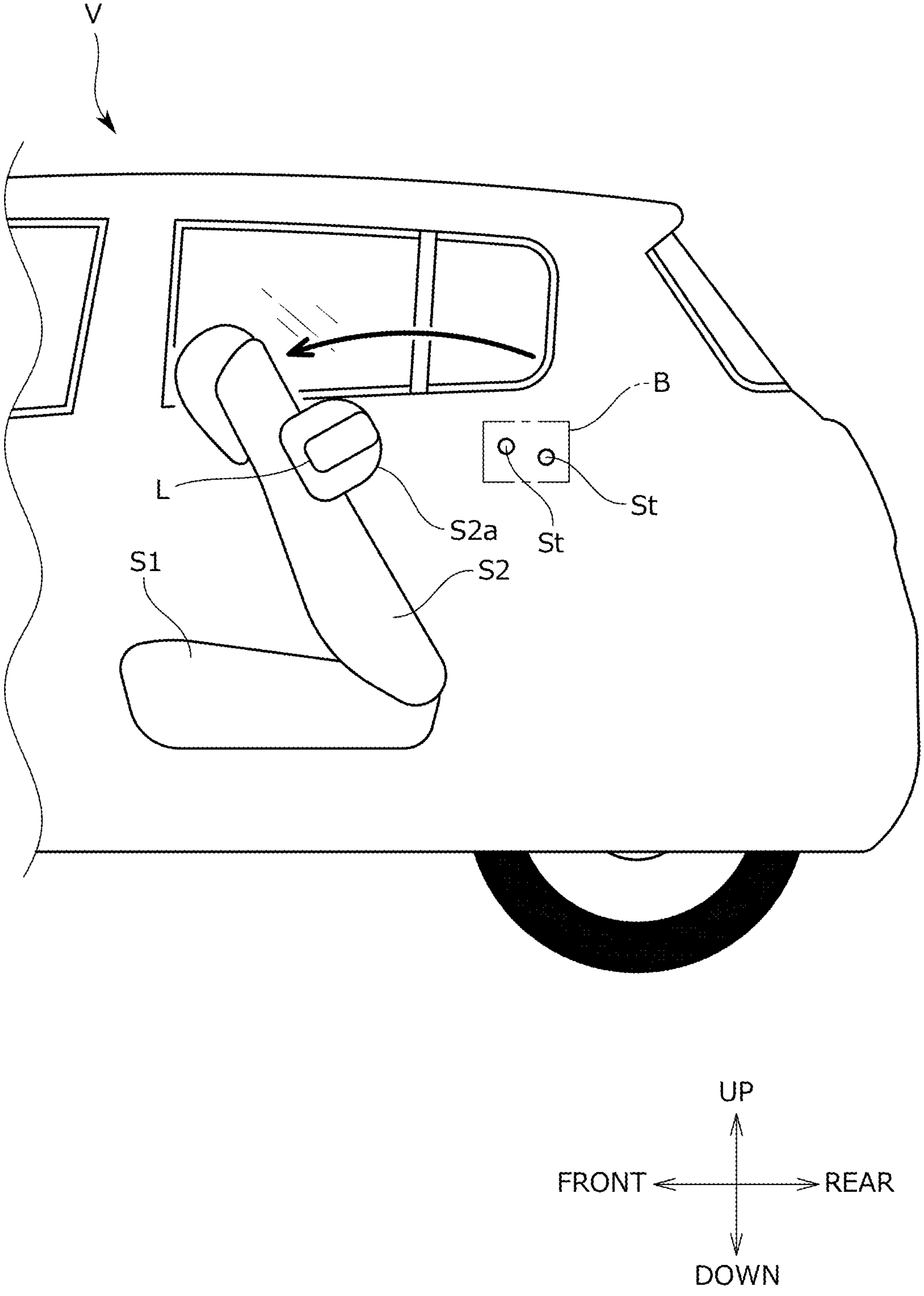
FIG. 1C is a schematic view showing the vehicle seat provided with the latch device and the vehicle, and is a view showing a state where the seat back is folded down at a release position where the holding of the seat back by the latch device is released.

In more detail, the latch device L is configured to be able to engage with the striker St at a position shown in FIG. 1A or 1B, and has a function of allowing the inclination position of the seat back S2 to be adjusted. In addition, the latch device L has a function of allowing the seat back S2 to be folded down as shown in FIG. 1C by being released from engagement with the striker St.

Incidentally, FIG. 1A shows a locked state where the latch device L is engaged with the striker St at an engagement position where the seat back S2 is most inclined. FIG. 1B shows a locked state where the latch device L is engaged with the striker St when the seat back S2 is at an intermediate position. FIG. 1C shows an unlocked state (lock-off state) where the latch device L is released from engagement with the striker St at a release position where the engagement of the latch device L with the striker St is released.

<Configuration of Latch Device>

Next, a configuration of the latch device L will be described with reference to FIGS. 2 to 8.

The latch device L mainly includes a housing 10 attached to the seat back S2; an unlocking operation knob 20 operated by the occupant; a link 30 operated by the unlocking operation knob 20; a latch 40 that engages with the striker St; a lock-off detection sensor 50 that detects the locked state of the latch device L with respect to the striker St; and a fastener 60 that fixes the latch device L to the seat back S2.

The latch device L is fixed to the seat back S2 of the vehicle seat S by the fastener 60 such as a bolt.

<Housing>

Figure 2:
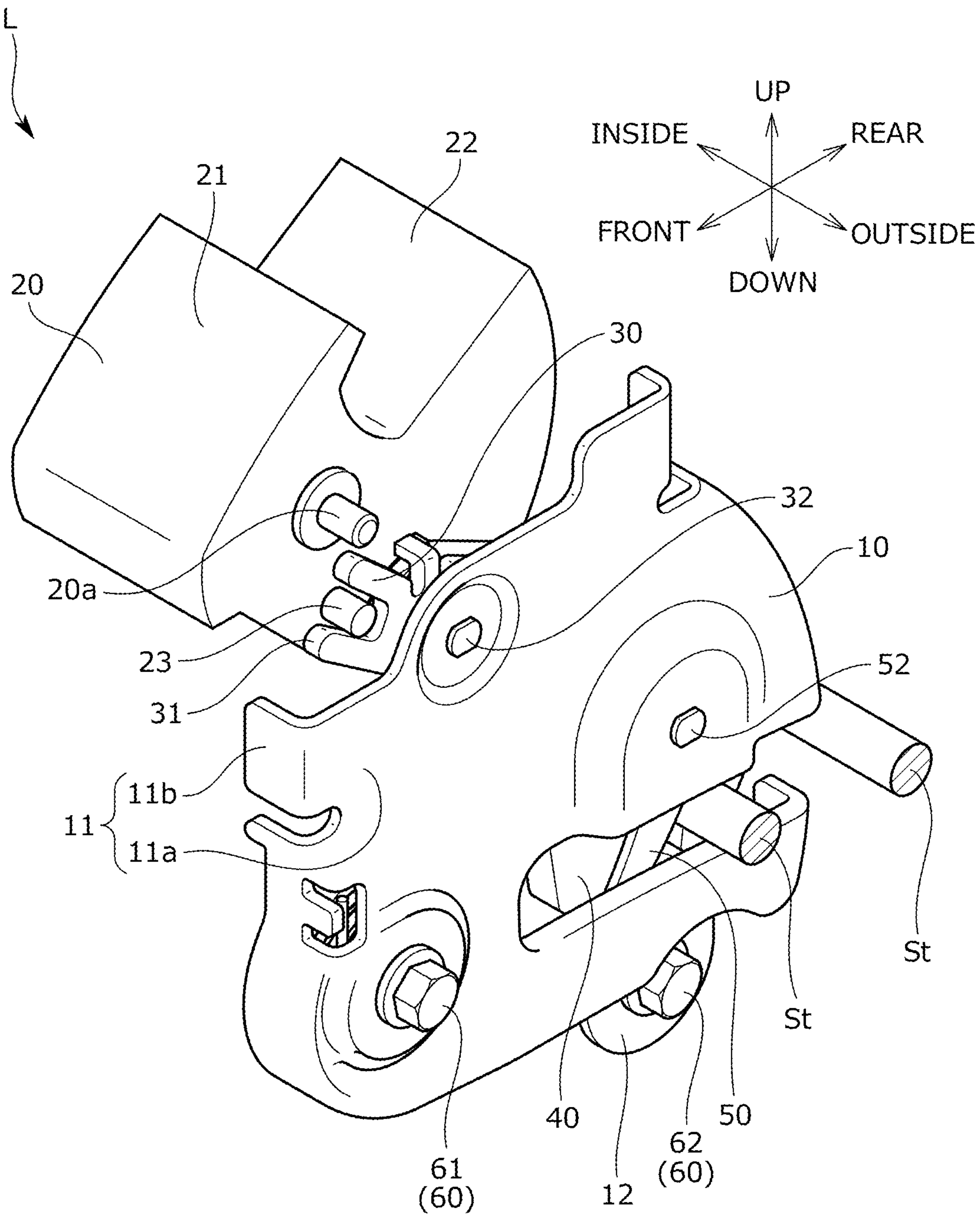
FIG. 2 is a perspective view of the latch device.
Figure 4:
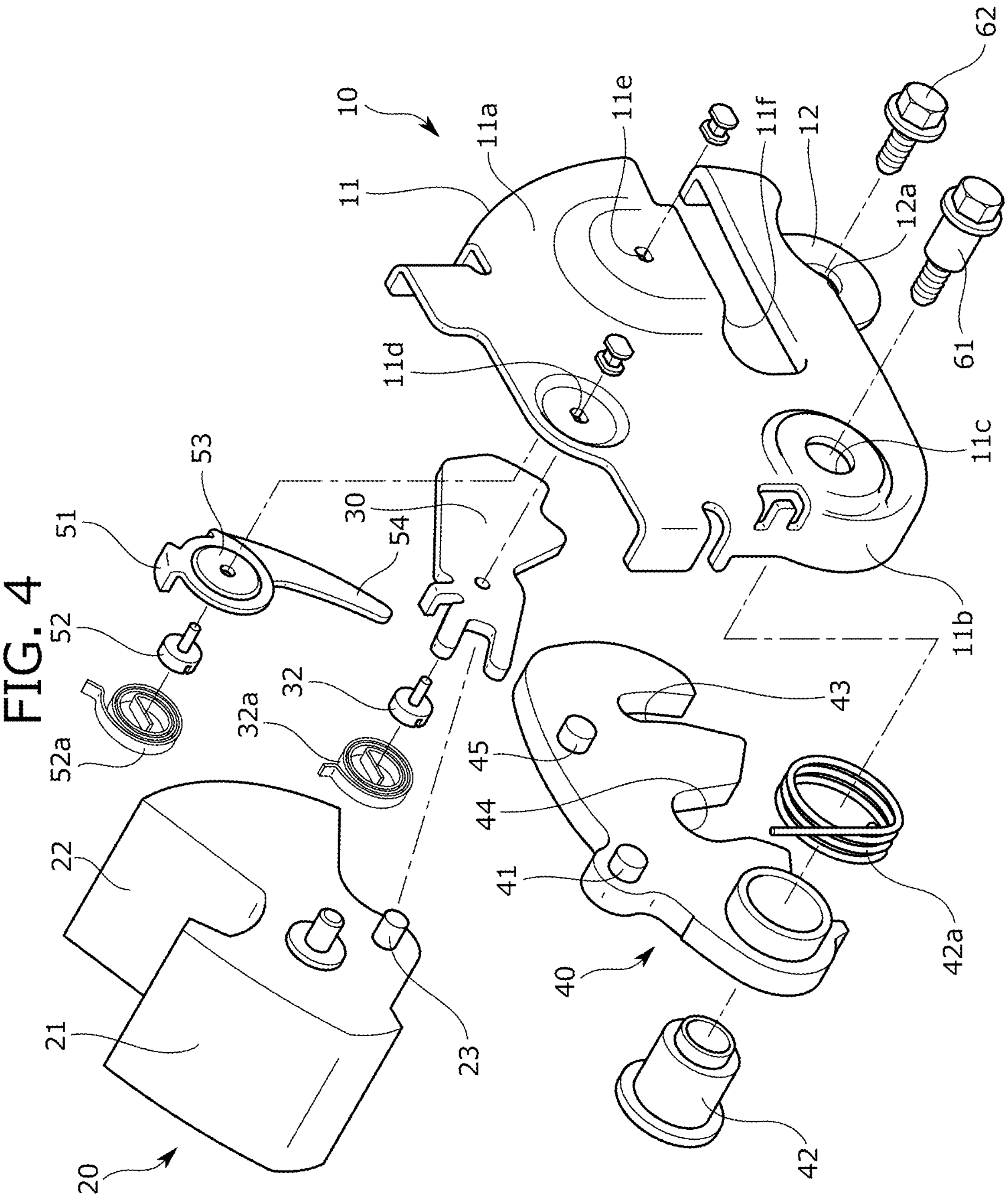
FIG. 4 is an exploded perspective view of the latch device.

The housing 10 is a resin cover member that covers the link 30, the latch 40, and the lock-off detection sensor 50 from the outside. As shown in FIGS. 2 and 4, the housing 10 mainly includes a housing body portion 11 that accommodates the latch 40 and the lock-off detection sensor 50 thereinside, and a flange 12 for attaching the housing 10 to the vehicle seat S.

The housing 10 is attached to the inside of the attachment portion S2*a* by the fasteners 60 (a first fastener 61 and a second fastener 62), and is disposed at a position covering the outside of the latch 40 and the lock-off detection sensor 50.

As shown in FIGS. 2 and 4, the housing body portion 11 includes a base portion 11*a* having a flat plate shape, and a rib portion 11*b* that is bent inward from the base portion 11*a* in the inside to outside direction. In addition, a latch shaft hole 11*c* that supports the latch 40, a link shaft hole 11*d* that supports the link 30, a sensor shaft hole 11*e* that supports the lock-off detection sensor 50, and a receiving groove 11*f* that receives the striker St are formed in the housing body portion 11.

As shown in FIG. 2, the base portion 11*a* is disposed at a position overlapping the latch 40 and the lock-off detection sensor 50 in the inside to outside direction.

The rib portion 11*b* is disposed at positions overlapping side surfaces of the latch 40 and the lock-off detection sensor 50 in the front to rear direction and lower surfaces thereof in the up to down direction.

In such a manner, since a space is formed inside by the base portion 11*a* and the rib portion 11*b*, the housing body portion 11 can accommodate the latch 40 and the lock-off detection sensor 50 thereinside. For that reason, the latch device L can be made smaller. In addition, interference between components such as the link 30, the latch 40, and the lock-off detection sensor 50 and a pad material and the like of the vehicle seat S disposed around the latch device L can be suppressed.

In addition, by forming the rib portion 11*b* of the housing body portion 11 around the latch 40, the movement of the latch 40 to the outside of the housing body portion 11 can be restricted. Further, by forming the rib portion 11*b* integrally with the base portion 11*a* in the housing body portion 11, the rigidity of the housing body portion 11 can be increased.

As shown in FIG. 2, the latch shaft hole 11*c* is formed at an upper portion of the housing body portion 11 to penetrate through the base portion 11*a* in the inside to outside direction. The latch shaft hole 11*c* is a first through-hole that rotatably supports the latch 40.

The link shaft hole 11*d* is formed at a lower front portion of the housing body portion 11 to penetrate through the base portion 11*a* in the inside to outside direction. The link shaft hole 11*d* rotatably supports the link 30.

The sensor shaft hole 11*e* is formed at a rear portion of the housing body portion 11 to penetrate through the base portion 11*a* in the inside to outside direction. The sensor shaft hole 11*e* rotatably supports the lock-off detection sensor 50.

As shown in FIG. 2, the receiving groove 11*f* is formed slightly below a middle portion of the length of the housing body portion 11 in the up to down direction by cutting out the housing body portion 11 forward from a rear end portion. The receiving groove 11*f* receives the striker St that enters the housing 10 when the latch device L is operated.

As shown in FIGS. 2 and 4, the flange 12 is a fixing portion having a thin plate shape and provided at a lower end portion of the housing body portion 11. An attachment hole 12*a* that is a second through-hole is formed in the flange 12.

Figure 5:
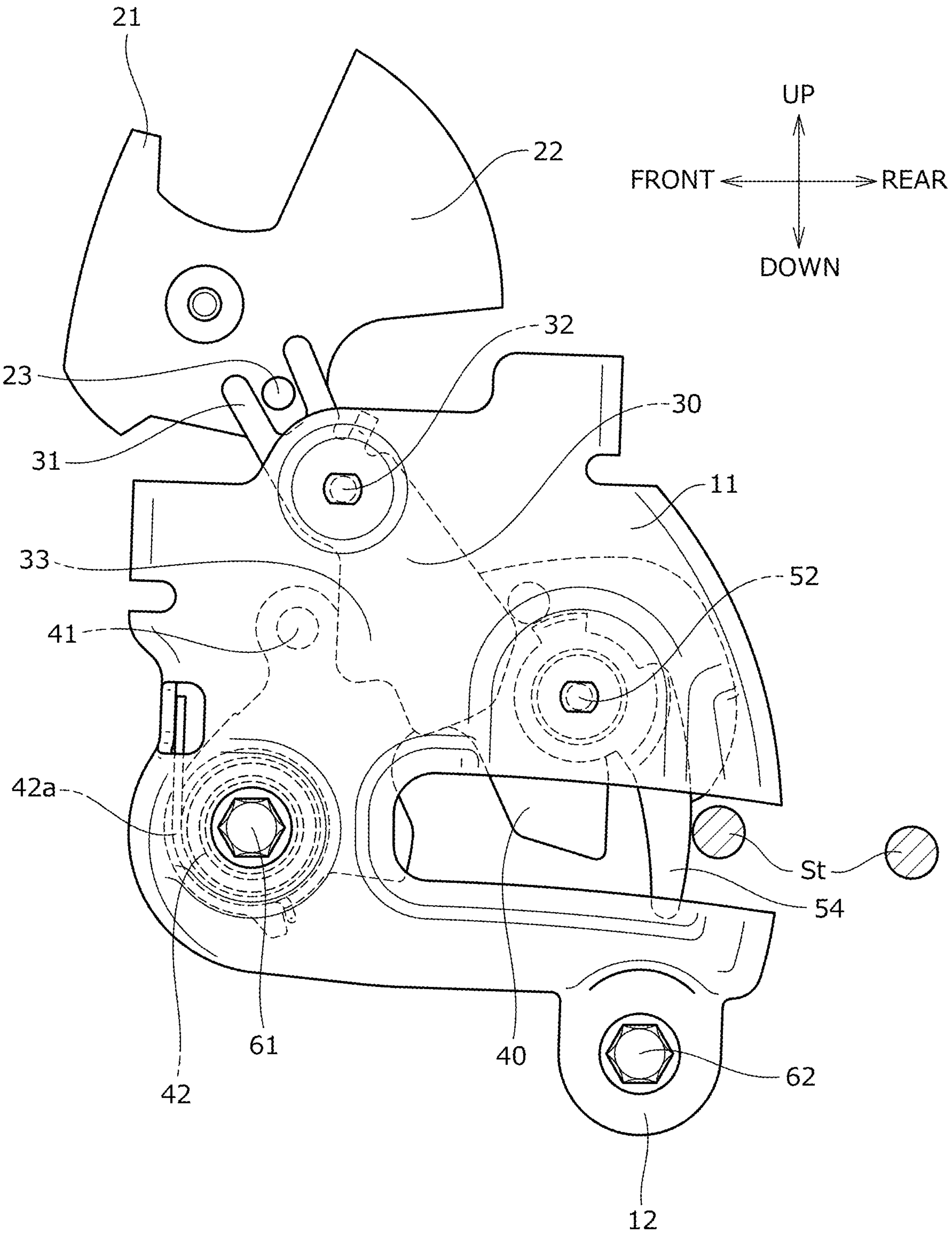
FIG. 5 is a front view of the latch device.

As shown in FIG. 5, the latch device L is fixed to the seat back S2 by the first fastener 61 inserted through the latch shaft hole 11*c* of the housing body portion 11 and the second fastener 62 inserted through the attachment hole 12*a*.

A tightening torque of the first fastener 61 is higher than a tightening torque of the second fastener 62. In such a manner, the latch device L can be more firmly attached in the latch shaft hole 11*c* corresponding to a rotating shaft of the latch 40.

Figure 7:
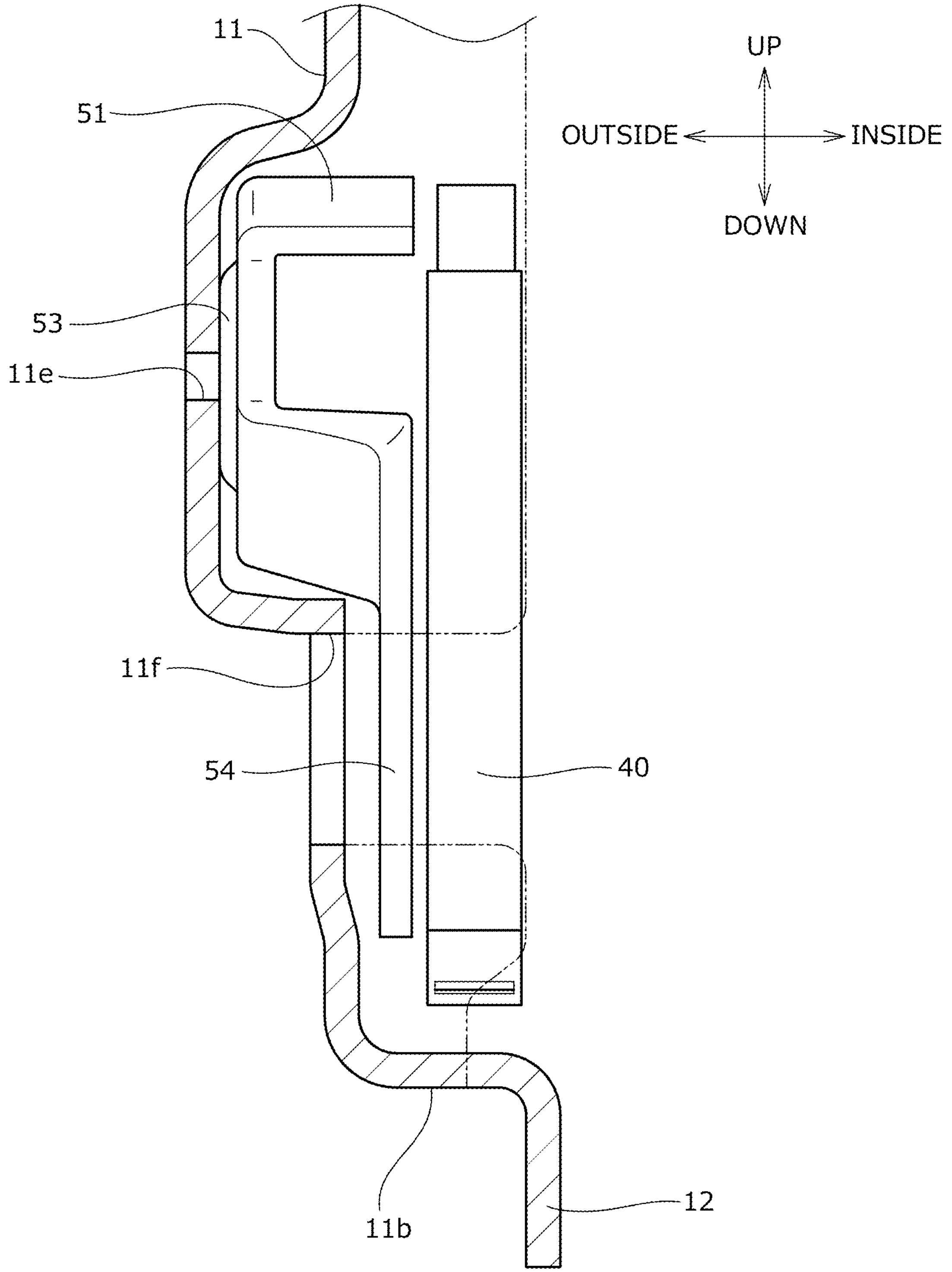
FIG. 7 is a side view of the latch device.

As shown in FIG. 7, a thickness of the flange 12 is smaller than a thickness of the housing body portion 11. Namely, regarding a length of the fasteners 60 required to fix the latch device L to the vehicle seat S, a length of the second fastener 62 inserted through the attachment hole 12*a* of the flange 12 is shorter than that of the first fastener 61 inserted through the latch shaft hole 11*c* of the housing body portion 11.

Therefore, the bolt length can be reduced by attaching the fastener 60 to the flange 12 that is thin rather than attaching a plurality of the fasteners 60 to the housing body portion 11 that is thick. Namely, when fixing is performed at two points, namely, the housing body portion 11 and the flange 12, the number of bolts can be reduced while ensuring fixing strength.

<Unlocking Operation Knob>

The unlocking operation knob 20 is an operating member for switching the latch 40 from the locked state to the unlocked state. As shown in FIGS. 2 to 6, the unlocking operation knob 20 mainly includes an operating portion 21 operated by the occupant; an indicator 22 showing a position of the latch 40; and a pin 23 that transmits an operation of the unlocking operation knob 20 to the link 30.

The unlocking operation knob 20 is made of, for example, resin, and the operating portion 21, the indicator 22, and the pin 23 are integrally molded to form a single member. By manufacturing resin components through integral molding, the number of components, manufacturing man-hours, and costs can be reduced while maintaining light weight.

The unlocking operation knob 20 is provided on the attachment portion S2*a* of the seat back S2 so as to be rotatable by an operating shaft portion 20*a*.

The operating portion 21 is a portion operated by the occupant when the latch 40 is displaced from the locked state to the unlocked state. As shown in FIGS. 2 to 6, the operating portion 21 is rotated by being pulled up, and releases engagement between the latch 40 and the striker St via the pin 23 and the link 30.

The indicator 22 is a portion showing each state of the locked state and the unlocked state of the latch 40. A portion of the indicator 22 is provided at a position where the portion is visible from the outside of the attachment portion S2*a* when the indicator 22 is attached to the seat back S2. The visible portion is colored red or the like to stand out.

Therefore, the indicator 22 displays that the latch 40 is in the unlocked state when the colored portion is located to be exposed from the attachment portion S2*a* and to be visible, and displays that the latch 40 is in the locked state when the colored portion is located to be invisible.

As shown in FIG. 2, the pin 23 is a portion that is displaced as the operating portion 21 is pulled up. The pin 23 is provided at a lower portion of the unlocking operation knob 20 at a position where the pin 23 engages with the link 30.

The pin 23 displaces the latch 40 via the link 30 with which the pin 23 engages. In addition, the pin 23 transmits each state of the locked state and the unlocked state of the latch 40 to the indicator 22, each state being transmitted from the link 30.

In more detail, when the latch 40 is in the unlocked state (FIGS. 9A, 9C, and 9D), the unlocking operation knob 20 rotates upward via the pin 23, and a display by the indicator 22 becomes visible. When the latch 40 is in the locked state (FIGS. 9B and 9E), the unlocking operation knob 20 rotates downward via the pin 23, and a display by the indicator 22 becomes invisible.

In such a manner, by providing the pin 23 in the unlocking operation knob 20, the number of components can be reduced, and manufacturing man-hours and costs can be reduced. In addition, by molding the pin 23 integrally with the unlocking operation knob 20 using the same member, the number of components, manufacturing man-hours, and costs can be reduced.

In addition, since the unlocking operation knob 20 is configured such that the operating portion 21, the indicator 22, and the pin 23 are integrally formed, and the locked state and the unlocked state are visible depending on the position of the indicator 22, the locked state and the unlocked state of the latch 40 can be confirmed with a simple configuration.

<Link>

The link 30 is a link member that transmits operations of the unlocking operation knob 20 and the latch 40. The link 30 is a plate-shaped metal member, and as shown in FIGS. 3 to 6, includes an engaging portion 31 that engages with the pin 23; a link shaft portion 32 supported by the housing body portion 11; and a contact portion 33 that comes into contact with the latch 40.

As shown in FIGS. 2 and 4, the link shaft portion 32 and the contact portion 33 are provided at positions overlapping the housing body portion 11 in the inside to outside direction. In such a manner, since a portion of the link 30 is covered by the housing body portion 11, interference between the link 30 and the pad material and the like of the vehicle seat S disposed around the latch device L can be suppressed.

The link 30 is rotated via the pin 23 as the operating portion 21 of the unlocking operation knob 20 is pulled up. Then, as the link 30 rotates, engagement between the latch 40 and the striker St is released.

In addition, the link 30 transmits each state of the locked state and the unlocked state of the latch 40 to the indicator 22 via the pin 23. Specifically, when the latch 40 is in the unlocked state (FIGS. 9A, 9C, and 9D), as the latch 40 comes into contact with the contact portion 33, the engaging portion 31 rotates around the link shaft portion 32, and the indicator 22 rotates upward via the pin 23. When the latch 40 is in the locked state (FIGS. 9B and 9E), as the contact between the latch 40 and the contact portion 33 is released, the engaging portion 31 rotates around the link shaft portion 32, and the indicator 22 rotates downward via the pin 23.

Figure 3:
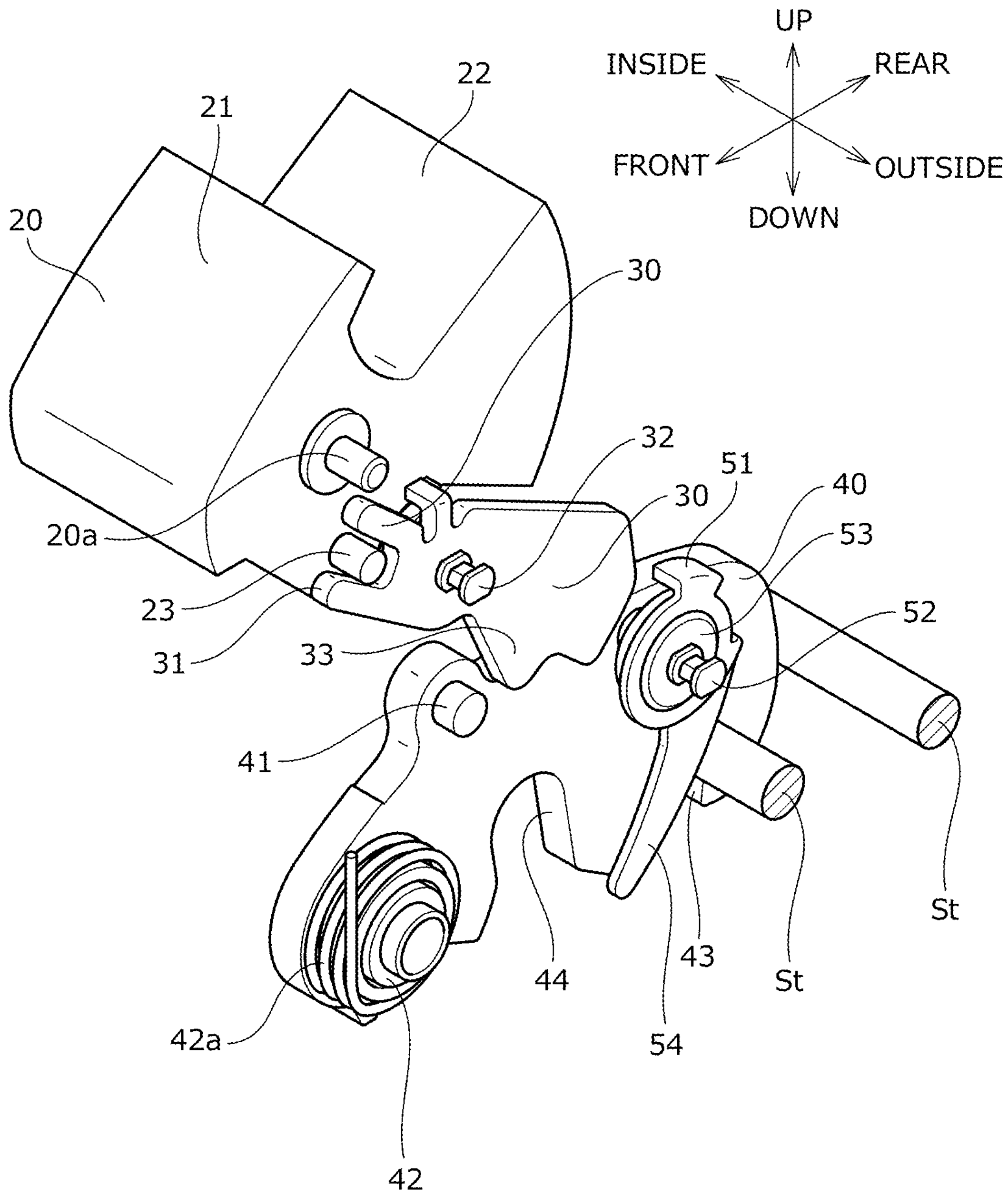
FIG. 3 is a perspective view of the latch device, and is a view showing a state where a housing is removed.

As shown in FIG. 3, the engaging portion 31 is provided at an end portion on an unlocking operation knob 20 side of the link 30, and is disposed at a position where the engaging portion 31 engages with the pin 23. One end portion on a pin 23 side of the engaging portion 31 is formed in an open U shape.

In such a manner, unlike a configuration in which an engaging portion surrounds a pin member, the one end portion of the engaging portion 31 is formed in an open U shape, the ease of assembly of the unlocking operation knob 20 and the link 30 can be improved.

Figure 8:
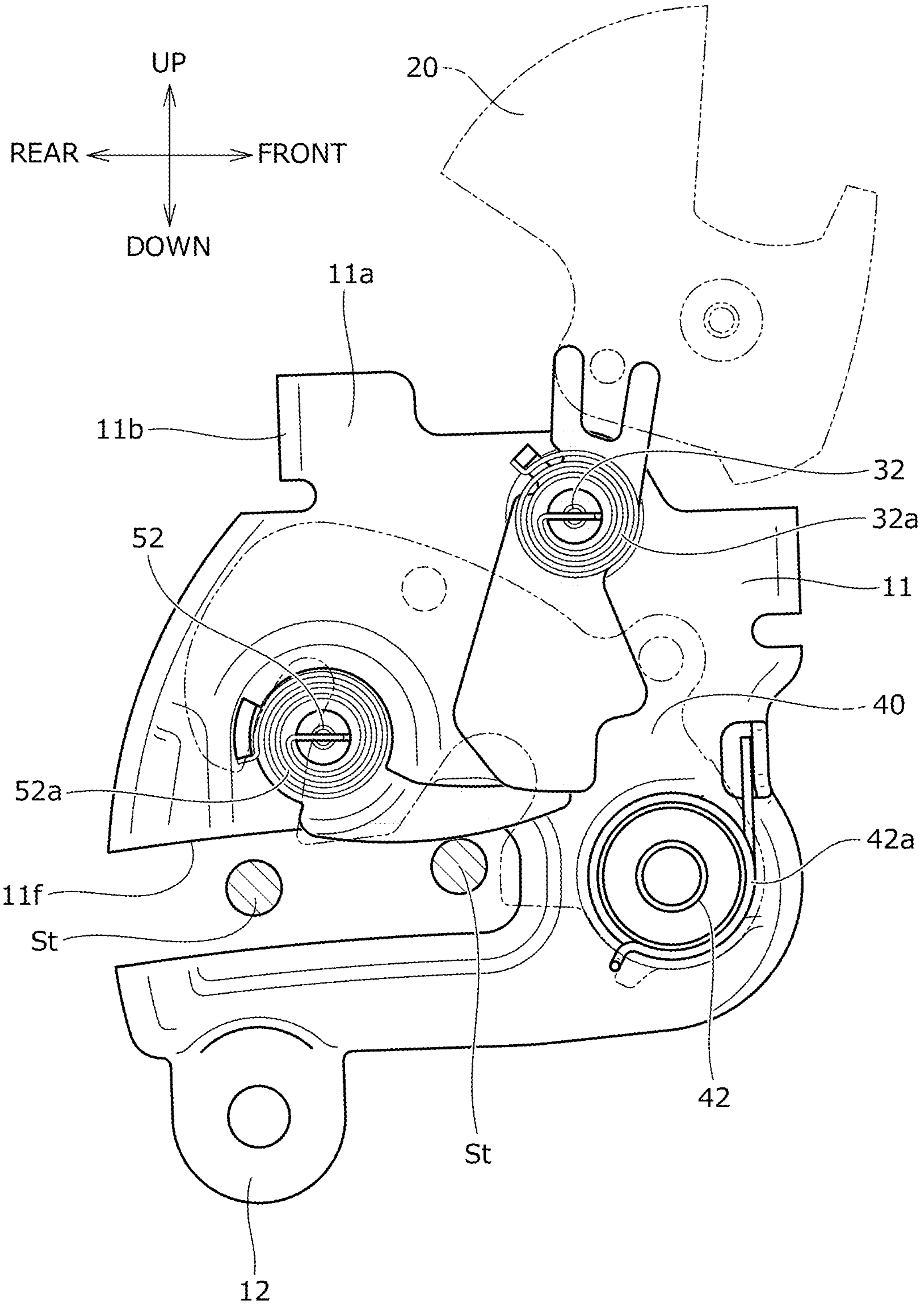
FIG. 8 is a back view of the latch device.

As shown in FIG. 2, the link shaft portion 32 is rotatably supported in the link shaft hole 11*d* of the housing body portion 11. As shown in FIG. 8, a spiral spring 32*a* is provided inside the link shaft portion 32 in the inside to outside direction. The link 30 is biased by the spiral spring 32*a* in a direction in which the engaging portion 31 rotates downward.

As shown in FIG. 3, as the unlocking operation knob 20 is operated, the contact portion 33 rotates forward around the link shaft portion 32, and comes into contact with the latch 40. As the contact portion 33 comes into contact with the latch 40, the latch 40 rotates forward, and engagement between the latch 40 and the striker St is released.

<Latch>

The latch 40 is a lock member that engages with the striker St to lock the position of the seat back S2. The latch 40 is, for example, a plate-shaped metal member, and is provided inside the housing body portion 11.

As shown in FIGS. 3 to 6, the latch 40 includes a contacted portion 41 that comes into contact with the link 30; a latch shaft portion 42 supported by the housing body portion 11; an engaging groove 43 that engages with the striker St; an escape groove 44 that the striker St enters; and a sensor contact pin 45 that comes into contact with the lock-off detection sensor 50.

As shown in FIGS. 2 and 4, the latch 40 is provided at a position overlapping the housing body portion 11 in the inside to outside direction. In such a manner, since the latch 40 is covered by the housing body portion 11, interference between the latch 40 and the pad material and the like of the vehicle seat S disposed around the latch device L can be suppressed.

The latch 40 is rotatably supported by the housing body portion 11, and can transition between the locked state where the latch 40 is engaged with the striker St and the unlocked state where the latch 40 is disengaged from the striker St.

Specifically, the unlocking operation knob 20 is rotated upward via the link 30 by being pulled up. Then, when the unlocking operation knob 20 is lowered at the intermediate position or the engagement position, the unlocking operation knob 20 is rotated downward via the link 30.

In addition, the latch 40 transmits each state of the locked state and the unlocked state to the indicator 22 via the link 30.

As shown in FIG. 3, the contacted portion 41 is provided at an upper end portion of the latch 40, and protrudes toward the outside. As the contact portion 33 comes into contact with the contacted portion 41, the contacted portion 41 rotates to an upper front side, and engagement between the engaging groove 43 and the striker St is released.

As shown in FIG. 2, the latch shaft portion 42 is provided at a front end portion of the latch 40, and protrudes toward the outside. The latch shaft portion 42 is rotatably supported in the latch shaft hole 11*c* of the housing body portion 11.

As shown in FIG. 8, a coil spring 42*a* is provided outside the latch shaft portion 42 and inside the housing body portion 11. The latch 40 is biased by the coil spring 42*a* in a direction in which the engaging groove 43 and the escape groove 44 rotate downward.

As shown in FIG. 3, the engaging groove 43 is provided at the rear end portion of the latch 40, and is formed by cutting out the latch 40 upward from a lower end portion. At the intermediate position (FIG. 9B), the engaging groove 43 engages with the front striker St to enter the locked state. At the engagement position (FIG. 9E), the engaging groove 43 engages with the rear striker St to enter the locked state.

As shown in FIG. 3, the escape groove 44 is provided at a middle portion of the latch 40 in the front to rear direction, and is formed by cutting out the latch 40 upward from the lower end portion. The front striker St enters the escape groove 44 at the engagement position (FIG. 9E).

Figure 6:
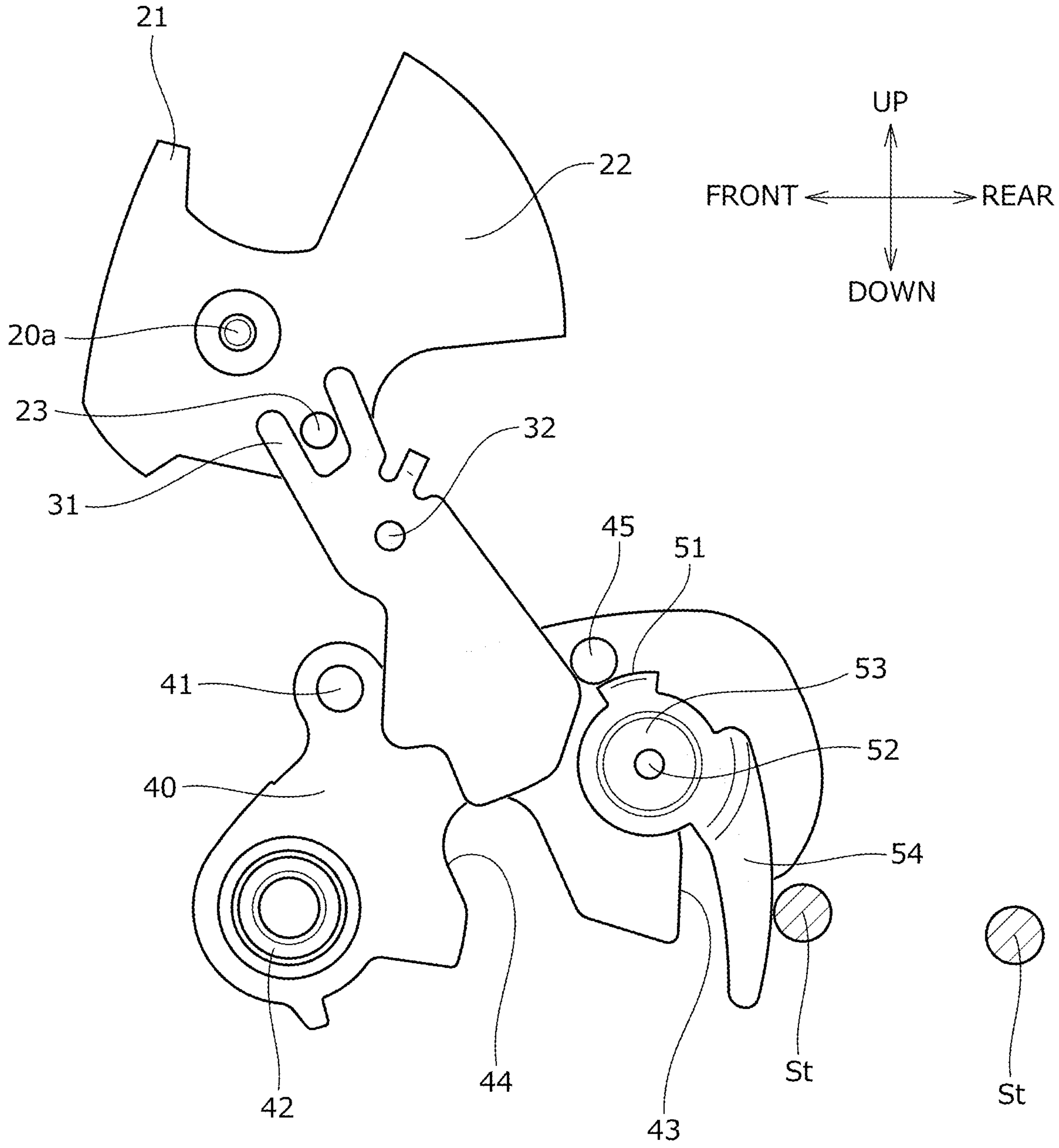
FIG. 6 is a front view of the latch device, and is a view showing a state where the housing is removed.

As shown in FIG. 6, the sensor contact pin 45 is provided at an upper end of the middle portion of the latch 40 in the front to rear direction, and protrudes toward the outside. In the unlocked state (lock-off state) at the release position, the sensor contact pin 45 comes into contact with the lock-off detection sensor 50 (sensor protrusion 51 to be described later) to restrict the rotation of the latch 40.

<Lock-Off Detection Sensor>

The lock-off detection sensor 50 is a sensor member that detects the unlocked state and the lock-off state where the striker St is outside the latch device L. The lock-off detection sensor 50 is a comma-shaped and plate-shaped member, and is provided inside the housing body portion 11.

As shown in FIGS. 3 to 6, the lock-off detection sensor 50 includes the sensor protrusion 51 that comes into contact with the sensor contact pin 45; a sensor shaft portion 52 supported by the housing body portion 11; a housing contact portion 53 that comes into contact with the housing body portion 11; and a striker detection portion 54 that comes into contact with the striker St.

As shown in FIGS. 2 and 4, the lock-off detection sensor 50 is provided at a position overlapping the housing body portion 11 in the inside to outside direction. In such a manner, since the lock-off detection sensor 50 is accommodated inside the housing body portion 11, interference between the lock-off detection sensor 50 and the pad material and the like of the vehicle seat S disposed around the latch device L can be suppressed.

In the lock-off state shown in FIG. 6, the sensor protrusion 51 is provided on an upper side of the lock-off detection sensor 50, and protrudes from the housing contact portion 53 toward the top. In the lock-off state, the sensor protrusion 51 comes into contact with the sensor contact pin 45 of the latch 40 to restrict downward rotation of the latch 40.

As shown in FIG. 2, the sensor shaft portion 52 is provided at a front central portion of the lock-off detection sensor 50, and is rotatably supported in the sensor shaft hole 11*e* of the housing body portion 11. As shown in FIG. 8, a spiral spring 52*a* is provided inside the sensor shaft portion 52. The lock-off detection sensor 50 is biased by the spiral spring 52*a* in a direction in which the sensor protrusion 51 rotates forward.

As shown in FIG. 2, the housing contact portion 53 is a portion that is provided around the sensor shaft portion 52, and that comes into contact with the base portion 11*a* of the housing body portion 11 of the housing body portion 11. As shown in FIGS. 3 and 7, a step is formed on the housing contact portion 53 to be located outside the striker detection portion 54 in the inside to outside direction.

The striker detection portion 54 is an elongated member extending from the housing contact portion 53 toward the bottom in the lock-off state shown in FIG. 6. Specifically, the striker detection portion 54 curves and extends toward a side (front side) opposite to a direction in which the striker detection portion 54 comes into contact with the striker St in the lock-off state.

In addition, in a state where the striker St has entered the latch device L (refer to FIGS. 8 and 9E), the striker detection portion 54 is rotated to a position where the striker detection portion 54 extends from the housing contact portion 53 toward the front, by coming into contact with the striker St.

In the lock-off state (refer to FIG. 9A), the sensor contact pin 45 of the latch 40 rides onto the sensor protrusion 51, the unlocking operation knob 20 cannot return to its original position, the unlocking operation knob 20 is raised halfway, and the indicator 22 displays that the latch 40 is in the lock-off state.

In the locked state (refer to FIG. 9B), the sensor contact pin 45 enters below the sensor protrusion 51, and the unlocking operation knob 20 returns to its original position, so that the indicator 22 moves down and becomes hidden. Therefore, it is displayed that the latch 40 is in the locked state.

In such a manner, the lock-off state of the latch device L can be detected depending on the position of the striker detection portion 54.

A positional relationship between the housing 10, the latch 40, and the lock-off detection sensor 50 will be described with reference to FIG. 7. The latch 40 is rotatably supported on the housing body portion 11 by the latch shaft portion 42. The housing contact portion 53 is rotatably supported on the housing body portion 11 by the sensor shaft portion 52. The striker detection portion 54 is disposed between the latch 40 and the housing contact portion 53 in an axial direction (the inside to outside direction) in which the latch 40 and the housing contact portion 53 are supported by the housing body portion 11.

In such a manner, since the striker detection portion 54 is provided at a position separated from the housing body portion 11 toward the inside, interference between the striker detection portion 54 and components provided around the latch device L can be suppressed.

In addition, as shown in FIG. 8, the housing 10 includes a plurality of biasing members (the spiral spring 32*a*, the coil spring 42*a*, and the spiral spring 52*a*) that bias the latch 40, the link 30, and the lock-off detection sensor 50 in one direction of respective rotation directions, respectively.

In a spiral spring, the spring thickness can be reduced without affecting the number of turns or the diameter of a spring core compared to a coil spring. For that reason, by adopting a spiral spring as at least one of the plurality of biasing members, the latch device L can be made smaller.

<Regarding Locked State and Unlocked State>

An engagement state between the latch device L and the striker St will be described with reference to FIGS. 9A to 9E.

Figure 9A:
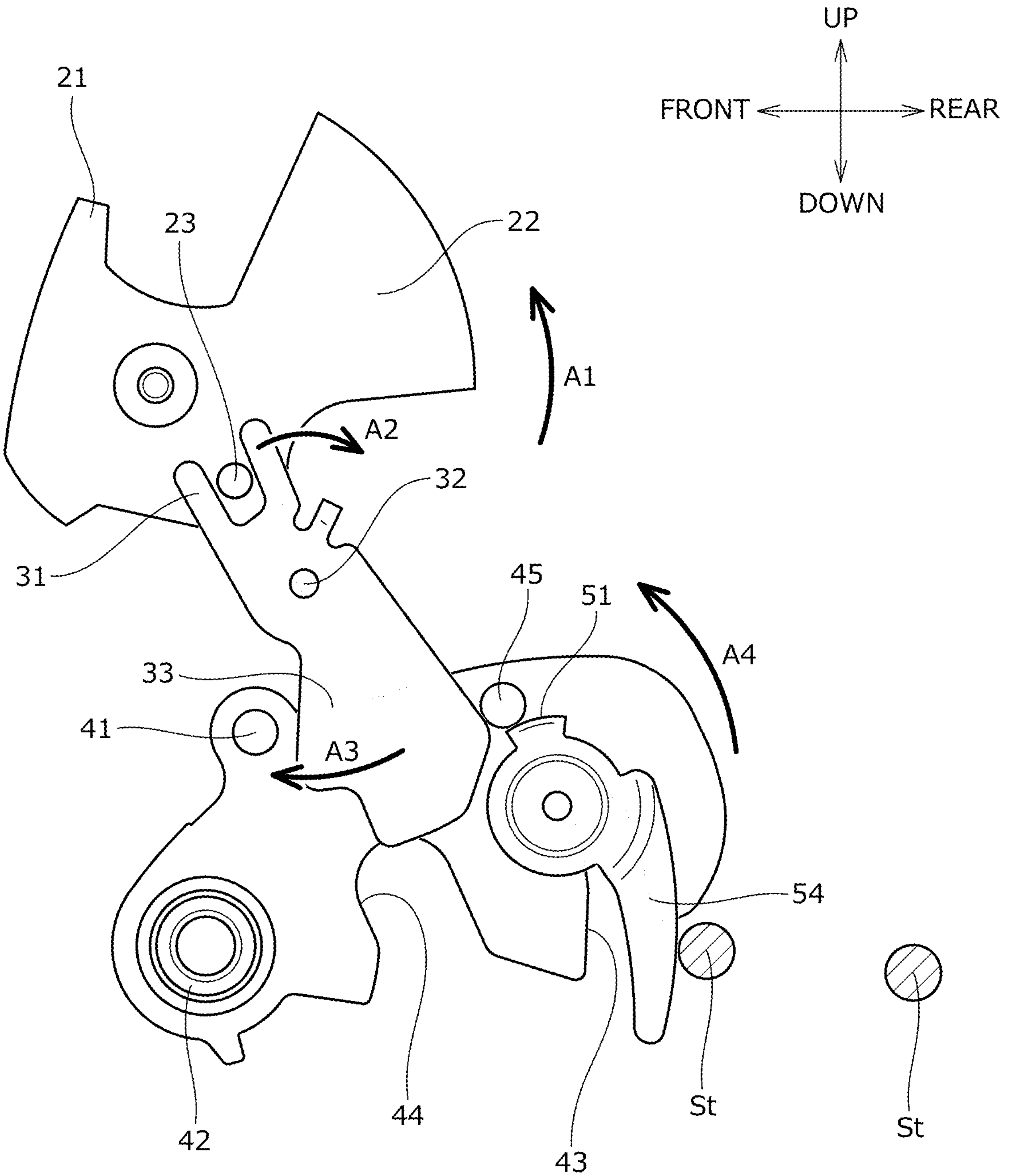
FIG. 9A is a view showing an unlocked state of the latch device at the release position.

FIG. 9A shows the unlocked state (lock-off state) where the latch 40 is not engaged with the striker St at the release position of the latch device L.

As the operating portion 21 of the unlocking operation knob 20 is pulled up from the locked state in the direction of arrow A1, the engaging portion 31 is rotated in the direction of arrow A2 via the pin 23. Then, as the contact portion 33 rotates around the link shaft portion 32 in the direction of arrow A3, the contact portion 33 comes into contact with the contacted portion 41 of the latch 40. Accordingly, the latch 40 is rotated in the direction of arrow A4, and the engaging groove 43 is brought into a locked-off state where the engaging groove 43 is disengaged from the striker St.

Figure 9B:
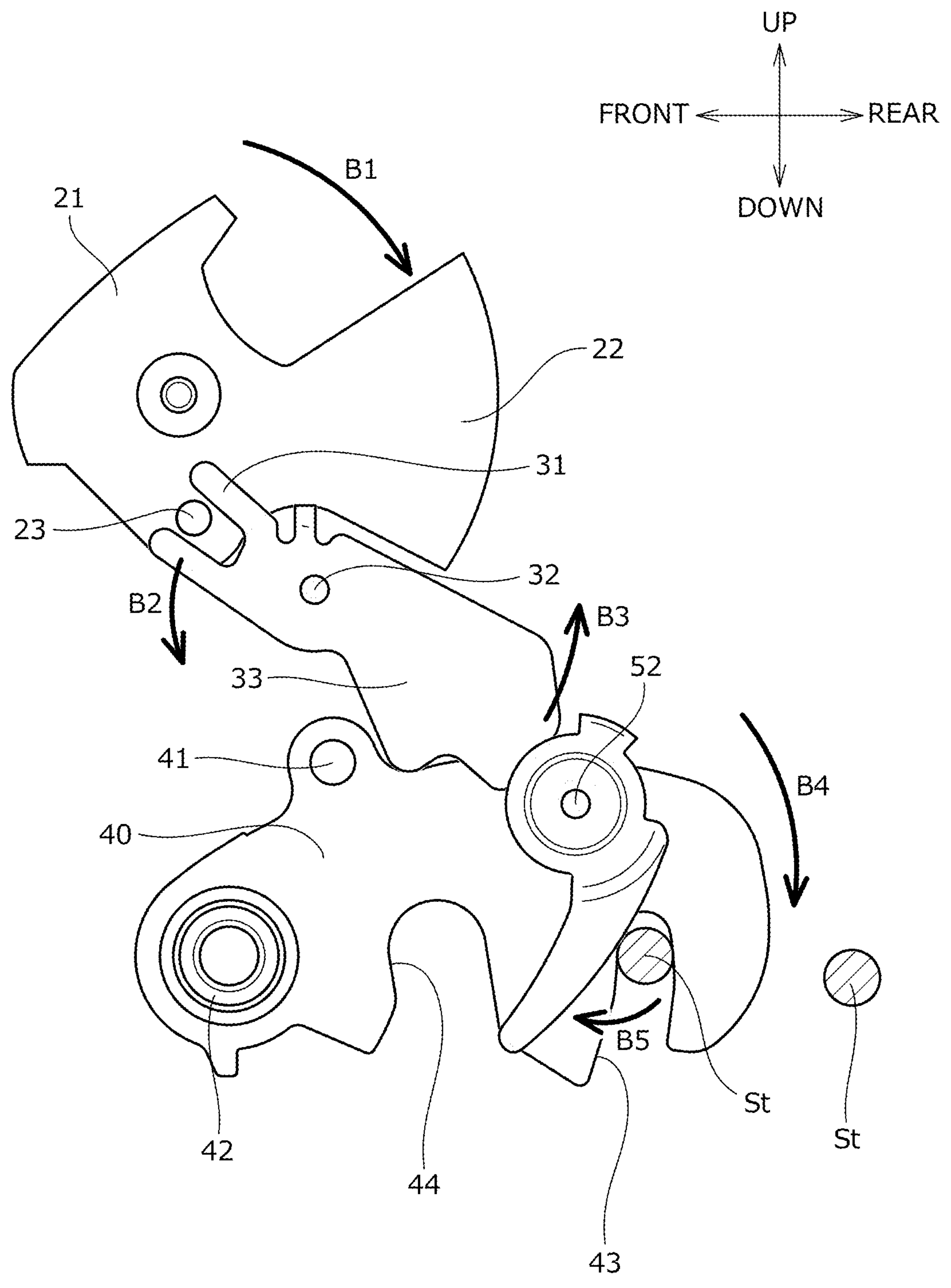
FIG. 9B is a view showing a locked state of the latch device at the intermediate position.

FIG. 9B shows a first-stage locked state where the engaging groove 43 of the latch 40 is engaged with the front striker St at the intermediate position of the latch device L.

The engaging portion 31 is rotated in the direction of arrow B2 from the state of FIG. 9A by the biasing force of the spiral spring 32*a*. At this time, the unlocking operation knob 20 is rotated in the direction of arrow B1 by the pin 23. Then, as the contact portion 33 rotates around the link shaft portion 32 in the direction of arrow B3, the contact of the contact portion 33 with the contacted portion 41 of the latch 40 is released. The biasing force of the coil spring 42*a* rotates the latch 40 in the direction of arrow B4, and brings the engaging groove 43 into the first-stage locked state where the engaging groove 43 is engaged with the front striker St.

At this time, the striker detection portion 54 comes into contact with the front striker St, so that the lock-off detection sensor 50 rotates around the sensor shaft portion 52 in the direction of arrow B5.

Figure 9C:
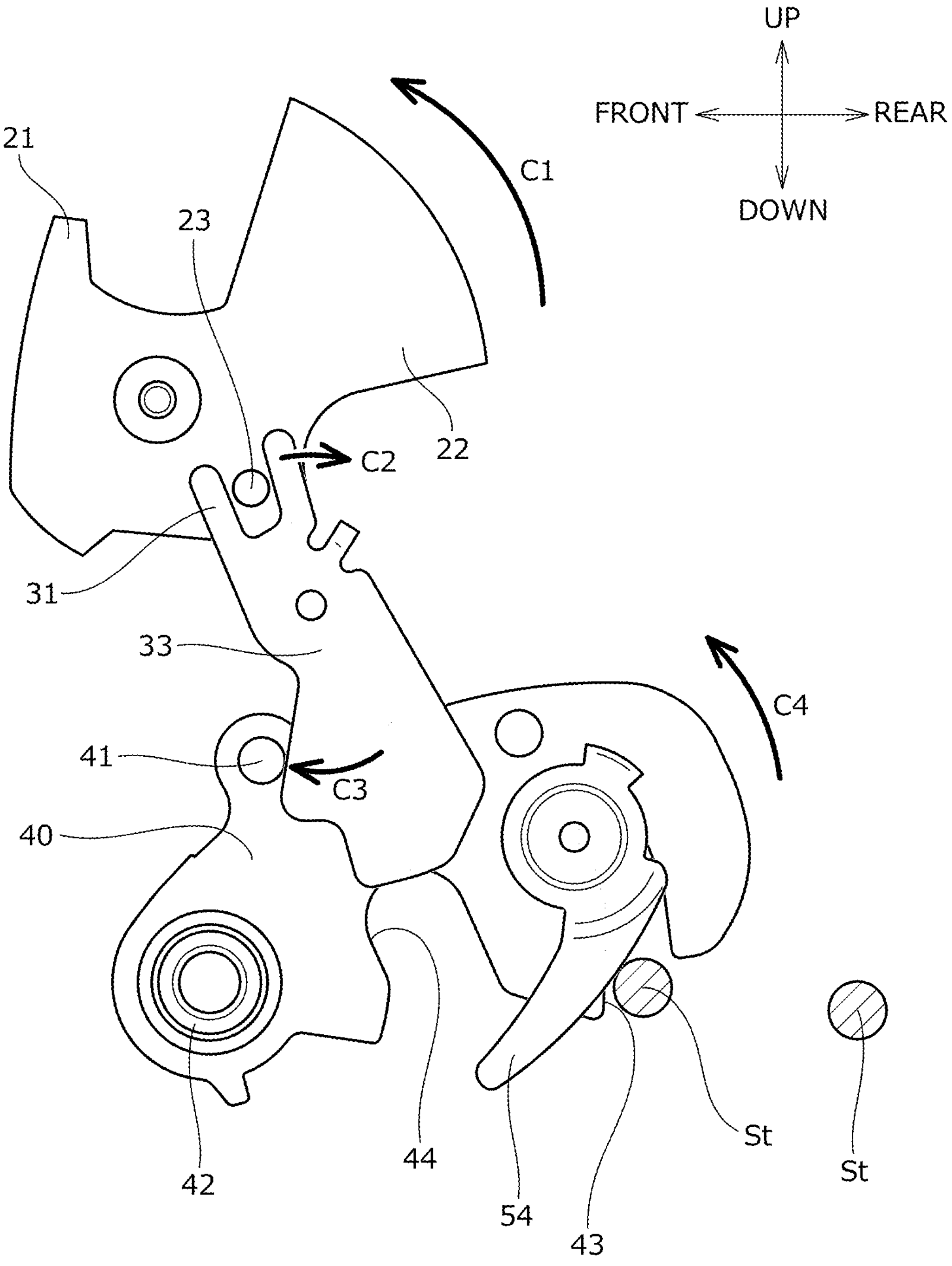
FIG. 9C is a view showing an unlocked state of the latch device at the intermediate position.

FIG. 9C shows a first-stage unlocked state where the latch 40 is not engaged with the striker St at the intermediate position of the latch device L.

As the operating portion 21 of the unlocking operation knob 20 is pulled up from the first-stage locked state in the direction of arrow C1, the engaging portion 31 is rotated in the direction of arrow C2 via the pin 23. Then, as the contact portion 33 rotates around the link shaft portion 32 in the direction of arrow C3, the contact portion 33 comes into contact with the contacted portion 41 of the latch 40. Accordingly, the latch 40 is rotated in the direction of arrow C4, and the engaging groove 43 is brought into the first-stage unlocked state where the engaging groove 43 is disengaged from the front striker St.

Figure 9D:
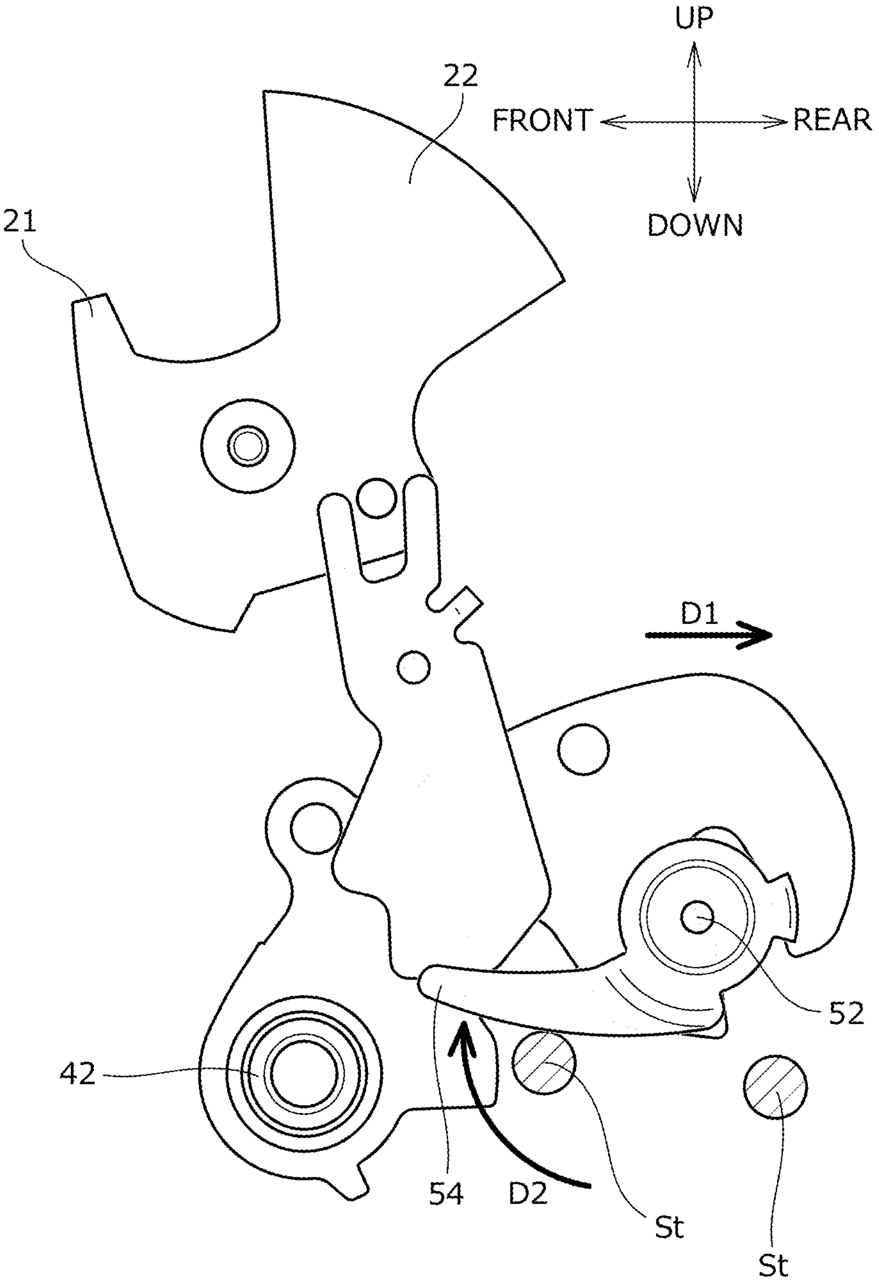
FIG. 9D is a view showing an unlocked state of the latch device at the engagement position.
Figure 9E:
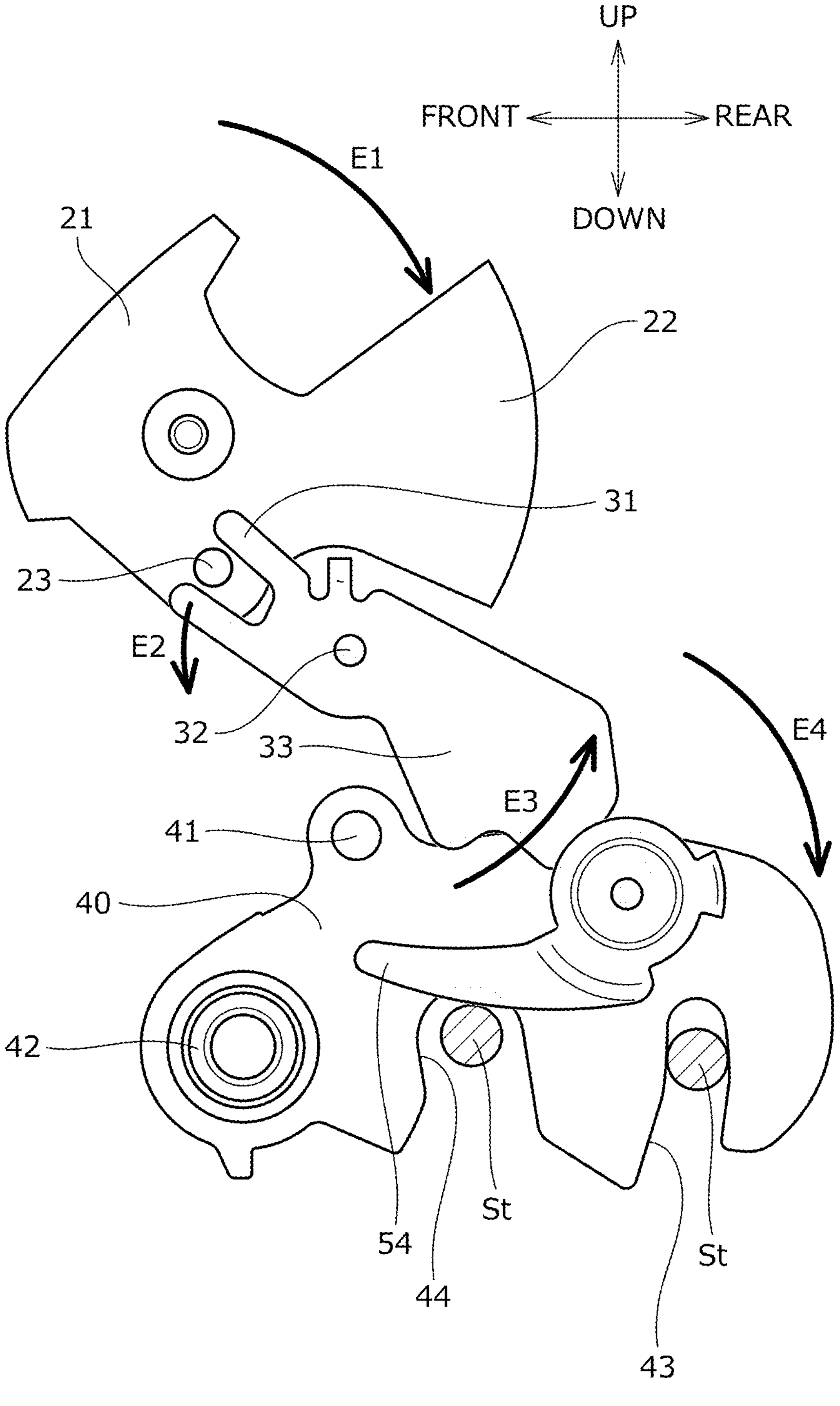
FIG. 9E is a view showing a locked state of the latch device at the engagement position.

FIG. 9D shows a second-stage unlocked state where the latch 40 is not engaged with the striker St at the engagement position of the latch device L.

In a state where the latch 40 is rotated upward, when the latch device L is moved from the first-stage unlocked state in the direction of arrow D1 (rearward), the second-stage unlocked state where the engaging groove 43 is located above the rear striker St and the escape groove 44 is located above the front striker St is reached.

At this time, the striker detection portion 54 comes into contact with an upper portion of the front striker St, so that the lock-off detection sensor 50 rotates around the sensor shaft portion 52 in the direction of arrow D2.

FIG. 9E shows a second-stage locked state where the engaging groove 43 of the latch 40 is engaged with the rear striker St at the engagement position of the latch device L.

The engaging portion 31 is rotated from the state of FIG. 9D in the direction of arrow E2 by the biasing force of the spiral spring 32*a*. At this time, the unlocking operation knob 20 is rotated in the direction of arrow E1 by the pin 23. Then, as the contact portion 33 rotates around the link shaft portion 32 in the direction of arrow E3, the contact of the contact portion 33 with the contacted portion 41 of the latch 40 is released. The biasing force of the coil spring 42*a* rotates the latch 40 in the direction of arrow E4, and causes the engaging groove 43 to engage with the rear striker St, so that the second-stage locked state is achieved. In addition, the front striker St enters the escape groove 44.

At this time, the striker detection portion 54 comes into contact with the front striker St, so that the lock-off detection sensor 50 maintains the rotated state shown in FIG. 9D.

In such a manner, with a simple configuration, the latch 40 can transition between the locked state and the unlocked state via the pin 23 provided on the unlocking operation knob 20, and the indicator 22 can appropriately display that the latch 40 is in the lock-off state.

Therefore, compared to a configuration in which the unlocking operation knob 20 and the pin 23 are separate components, the number of components, manufacturing man-hours, and costs can be reduced.

Modification Example 1

Next, Modification Example 1 of the latch device L will be described based on FIG. 10. Incidentally, description of contents that overlap with those of the latch device L described above will be omitted (the same applies below).

Figure 10:
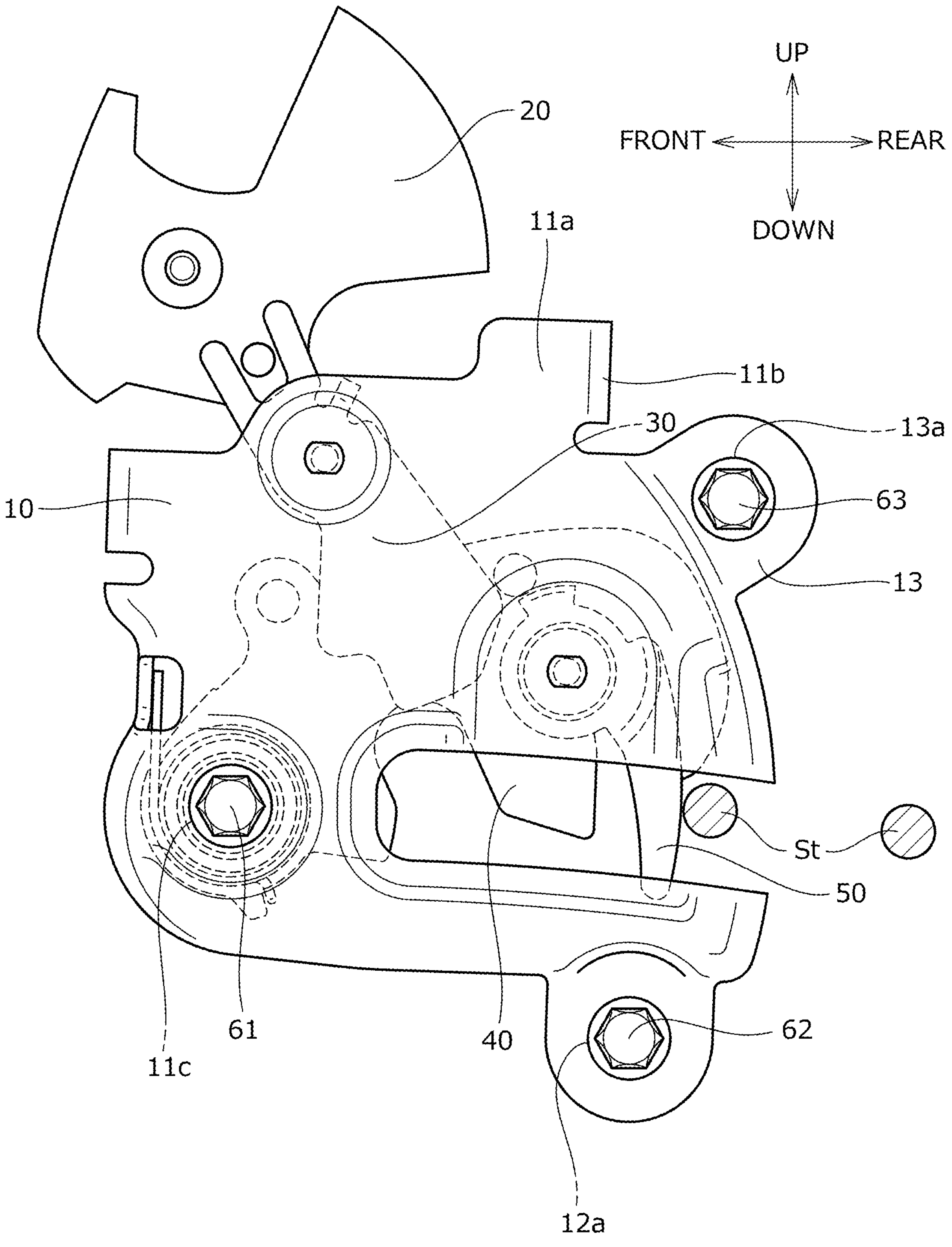
FIG. 10 is a front view of a latch device of Modification Example 1.

As shown in FIG. 10, the housing 10 of the latch device L of Modification Example 1 includes the housing body portion 11; the flange 12 to which the housing 10 is attached; and a fixing flange 13.

The fixing flange 13 is a fixing portion having a thin plate shape and provided at an upper rear end portion of the housing body portion 11. A fixing attachment hole 13*a* that is a third through-hole is formed in the fixing flange 13.

The latch device L of Modification Example 1 is fixed to the vehicle seat S by a first fastener 61 inserted through the latch shaft hole 11*c* of the housing body portion 11, the second fastener 62 inserted through the attachment hole 12*a*, and third fastener 63 inserted through the fixing attachment hole 13*a*.

In such a manner, by performing fixing on the flange 12 that is thin, fixing is performed at three points, namely, the housing body portion 11, the flange 12, and the fixing flange 13 while reducing the bolt length, so that more firm fixing can be achieved.

Modification Example 2

Next, Modification Example 2 of the latch device L will be described based on FIG. 11.

Figure 11:
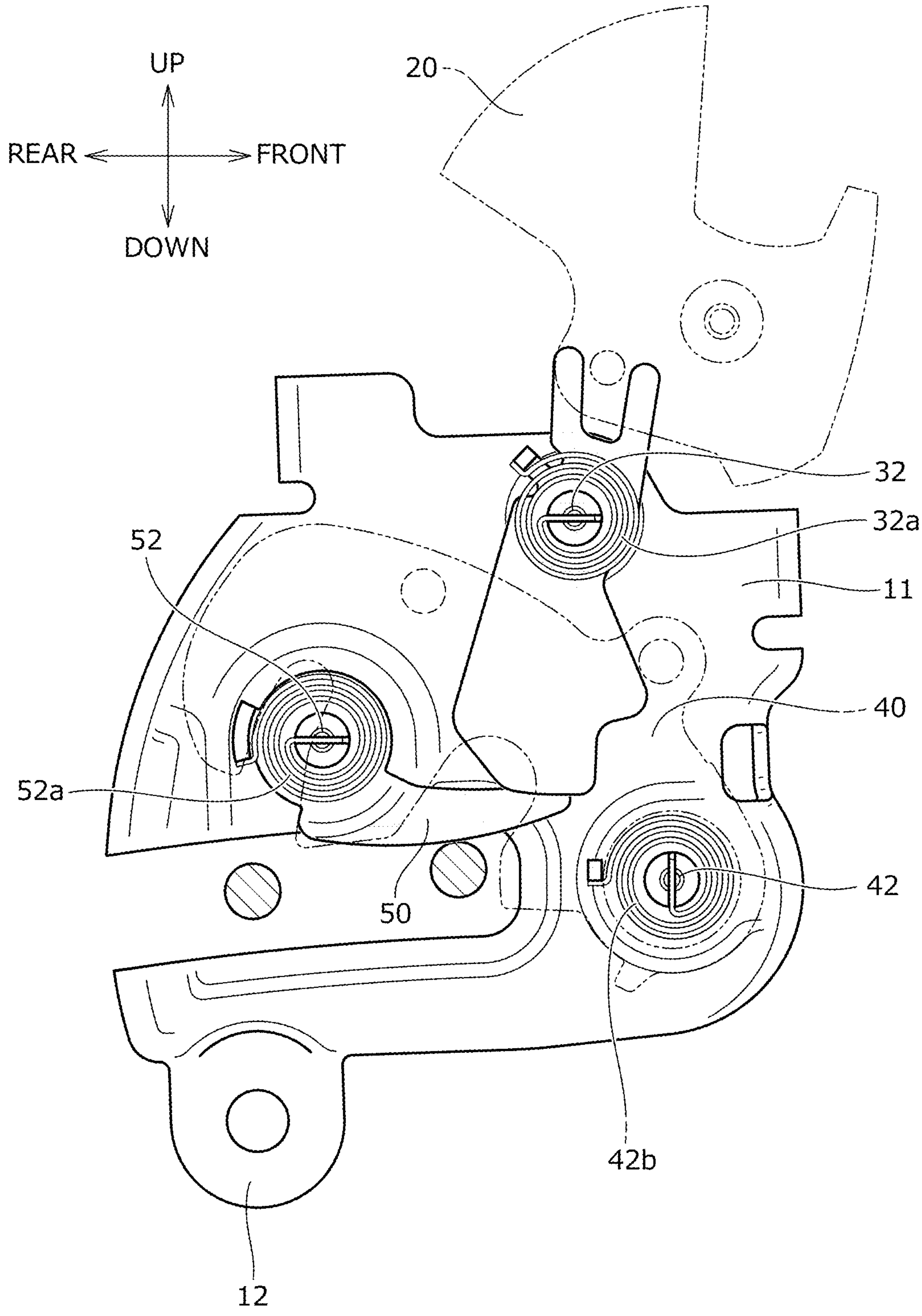
FIG. 11 is a back view of a latch device of Modification Example 2.

As shown in FIG. 11, in the latch device L of Modification Example 2, a spiral spring 42*b* is provided inside the latch shaft portion 42. The latch 40 is biased by the spiral spring 42*b* in the direction in which the engaging groove 43 and the escape groove 44 rotate downward.

As described above, in a spiral spring, the spring thickness can be reduced without affecting the number of turns or the diameter of a spring core compared to a coil spring. For that reason, the latch device L can be made smaller by using the spiral spring 42*b*.

In the above-described embodiment, a case where the striker St is installed on the vehicle body inner wall B and the latch device L is attached to the seat back S2 has been described; however, the latch device L can be attached to a portion of the vehicle seat S, such as the seat cushion S1, a headrest, or an armrest. In addition, the location where the striker St is attached is not limited to the vehicle body inner wall B, and may be a portion of another vehicle body such as a floor.

Figure 12:
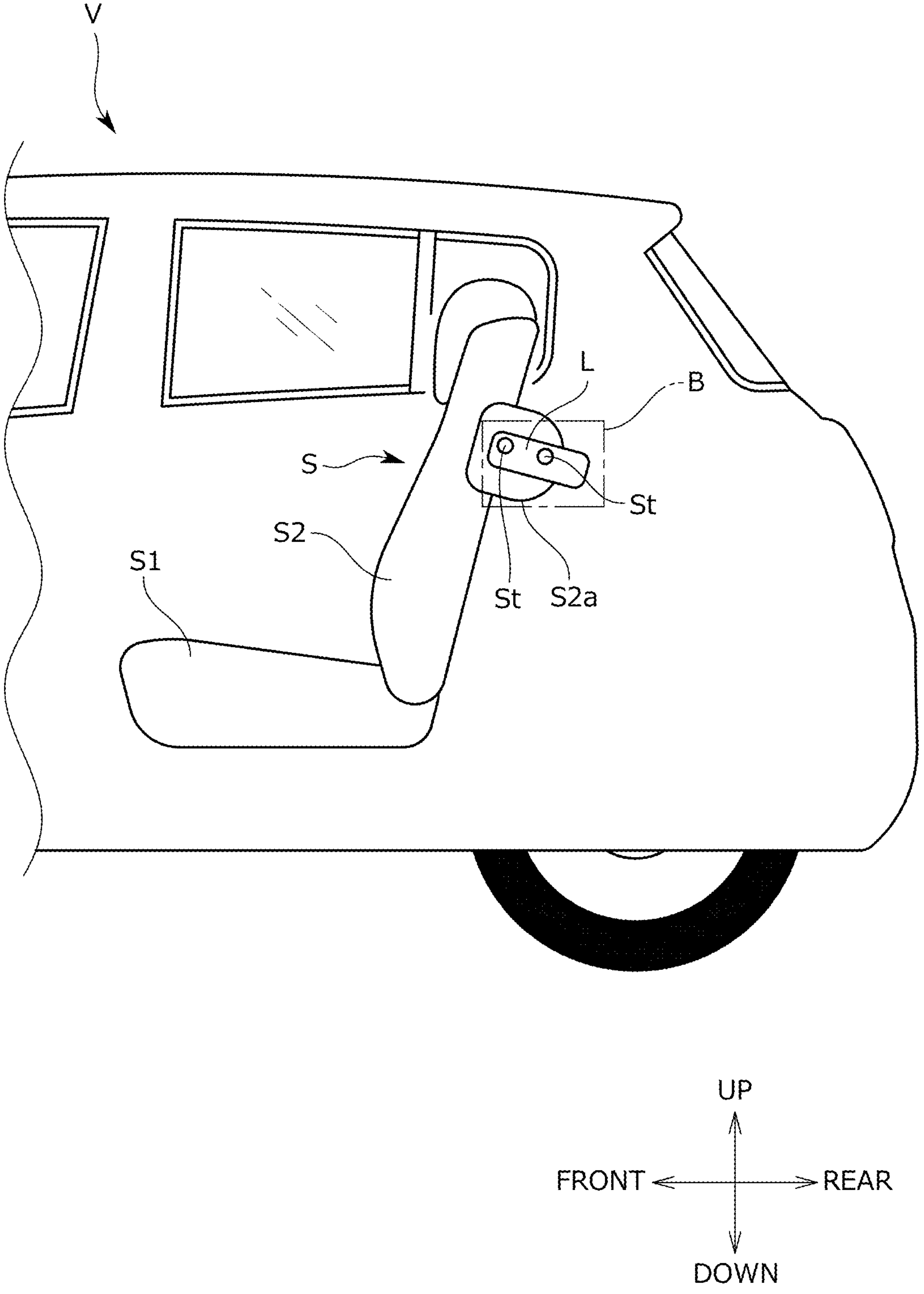
FIG. 12 is a schematic view showing a vehicle in which a vehicle body is provided with a latch device and a vehicle seat is provided with a striker.

For example, as shown in FIG. 12, the latch device L may be attached to the vehicle body inner wall B, and the striker St may be installed at the attachment portion S2*a* of the seat back S2.

In the above-described embodiment, the latch device, the vehicle seat, and the vehicle according to the present invention have been mainly described.

However, the embodiment is merely an example for facilitating understanding of the present invention, and does not limit the present invention. The present invention can be changed and improved without departing from the concept of the present invention, and it goes without saying that the present invention includes its equivalents.

REFERENCE SIGNS LIST

V: vehicle
S: vehicle seat
  S1: seat cushion
  S2: seat back
    S2*a*: attachment portion
B: vehicle body inner wall (vehicle body)
St: striker
L: latch device
10: housing
11: housing body portion
  11*a*: base portion
  11*b*: rib portion
  11*c*: latch shaft hole (first through-hole)
  11*d*: link shaft hole
  11*e*: sensor shaft hole
  11*f*: receiving groove
12: flange
  12*a*: attachment hole (second through-hole)
13: fixing flange
  13*a*: fixing attachment hole (third through-hole)
20: unlocking operation knob
  20*a*: operating shaft portion

21: operating portion
22: indicator
23: pin
30: link
31: engaging portion
32: link shaft portion
32*a*: spiral spring (biasing member)
33: contact portion
40: latch
41: contacted portion
42: latch shaft portion
42*a*: coil spring (biasing member)
42*b*: spiral spring (biasing member)
43: engaging groove
44: escape groove
45: sensor contact pin
50: lock-off detection sensor
51: sensor protrusion
52: sensor shaft portion
52*a*: spiral spring (biasing member)
53: housing contact portion
54: striker detection portion
60: fastener
61: first fastener
62: second fastener
63: third fastener

The invention claimed is:

1. A latch device that engages with a striker installed on a vehicle body or a vehicle seat, comprising:

a latch that can transition between a locked state where the latch is engaged with the striker and an unlocked state where the latch is disengaged from the striker;

an unlocking operation knob for switching the latch from the locked state to the unlocked state;

an indicator provided on the unlocking operation knob, and showing each state of the locked state and the unlocked state of the latch;

a link that transmits each state of the latch to the indicator; and a pin that engages with the link, and that transmits each state of the latch to the indicator, each state being transmitted from the link, wherein the pin is provided on the unlocking operation knob, and the pin is molded integrally with the unlocking operation knob.

2. The latch device according to claim 1, wherein the link includes an engaging portion at an end portion on an unlocking operation knob side of the link, the engaging portion engaging with the pin, and one end portion on a pin side of the engaging portion is open.

3. The latch device according to claim 2, wherein the one end portion on the pin side of the engaging portion has an open U shape.

4. A latch device that engages with a striker installed on a vehicle body or a vehicle seat, comprising:

a latch that can transition between a locked state where the latch is engaged with the striker and an unlocked state where the latch is disengaged from the striker;

an unlocking operation knob for switching the latch from the locked state to the unlocked state;

an indicator provided on the unlocking operation knob, and showing each state of the locked state and the unlocked state of the latch;

a link that transmits each state of the latch to the indicator; and a pin that engages with the link, and that transmits each state of the latch to the indicator, each state being transmitted from the link;

a housing that accommodates the latch inside the housing; and a lock-off detection sensor that detects the unlocked state and a lock-off state where the striker is outside the latch device, wherein the pin is provided on the unlocking operation knob, the latch is rotatably supported by the housing, and includes a sensor contact pin that comes into contact with the lock-off detection sensor, the lock-off detection sensor includes a sensor protrusion that comes into contact with the sensor contact pin, and the sensor contact pin comes into contact with the sensor protrusion in the lock-off state to restrict a rotation of the latch from the unlocked state to the locked state.

5. The latch device according to claim 4, wherein the link includes an engaging portion at an end portion on an unlocking operation knob side of the link, the engaging portion engaging with the pin, and one end portion on a pin side of the engaging portion is open.

6. The latch device according to claim 5, wherein the one end portion on the pin side of the engaging portion has an open U shape.

7. The latch device according to claim 4, wherein the lock-off detection sensor includes the sensor protrusion, a housing contact portion rotatably supported by the housing, and a striker detection portion extending from the housing contact portion toward a striker side in the lock-off state to come into contact with the striker, and the striker detection portion curves and extends toward a side opposite to a direction in which the striker detection portion comes into contact with the striker in the lock-off state.

8. The latch device according to claim 7, wherein the striker detection portion is disposed between the latch and the housing contact portion in an axial direction in which the latch and the housing contact portion are supported by the housing.

9. The latch device according to claim 4, wherein the lock-off detection sensor is accommodated inside the housing.

10. The latch device according to claim 1, further comprising:

a housing that accommodates the latch inside the housing, wherein the housing includes a housing body portion that accommodates the latch inside the housing body portion, and a flange provided on an outer periphery of the housing body portion, the housing body portion has a first through-hole that supports a rotating shaft of the latch, the flange has a second through-hole, and the latch device is fixed to the vehicle seat by a first fastener inserted through the first through-hole and a second fastener inserted through the second through-hole.

11. The latch device according to claim 10, wherein a tightening torque of the first fastener is higher than a tightening torque of the second fastener.

12. The latch device according to claim 10, wherein the housing has a third through-hole at a position different from positions of the first through-hole and the second through-hole, and the latch device is fixed to the vehicle seat by the first fastener, the second fastener, and a third fastener inserted through the third through-hole.

13. The latch device according to claim 1, further comprising:

a housing that accommodates the latch inside the housing; and a lock-off detection sensor that detects the unlocked state and a lock-off state where the striker is outside the latch device, wherein each of the latch, the link, and the lock-off detection sensor is rotatably supported by the housing, the housing includes a plurality of biasing members that bias the latch, the link, and the lock-off detection sensor in one direction of respective rotation directions, respectively, and at least one of the plurality of biasing members is a spiral spring.

14. A vehicle seat, comprising:

the latch device according to claim 1.

15. A vehicle, comprising:

the vehicle seat according to claim 14.

16. A method of manufacturing a latch device that engages with a striker installed on a vehicle body or a vehicle seat, comprising:

preparing a latch that can transition between a locked state where the latch is engaged with the striker and an unlocked state where the latch is disengaged from the striker; an unlocking operation knob for switching the latch from the locked state to the unlocked state; an indicator provided on the unlocking operation knob, and showing each state of the locked state and the unlocked state of the latch; a link that transmits each state of the latch to the indicator; and a pin that is molded integrally with the unlocking operation knob and engages with the link, and that transmits each state of the latch to the indicator, each state being transmitted from the link;

disposing the link on the latch; and engaging the pin with the link.

* * * * *